US008749816B2

(12) United States Patent
Sunada et al.

(10) Patent No.: US 8,749,816 B2
(45) Date of Patent: Jun. 10, 2014

(54) PRINTING SYSTEM, PRINTING APPARATUS, AND DOLLY DESIGNATION METHOD

(75) Inventors: Hidenori Sunada, Abiko (JP); Mitsuhiko Sato, Kashiwa (JP); Naoto Watanabe, Abiko (JP); Takashi Yokoya, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1331 days.

(21) Appl. No.: 12/524,673

(22) PCT Filed: Mar. 7, 2008

(86) PCT No.: PCT/JP2008/054673
§ 371 (c)(1),
(2), (4) Date: Jul. 27, 2009

(87) PCT Pub. No.: WO2008/114702

PCT Pub. Date: Sep. 25, 2008

(65) Prior Publication Data

US 2010/0091323 A1 Apr. 15, 2010

(30) Foreign Application Priority Data

Mar. 15, 2007 (JP) ................................ 2007-067594
Mar. 20, 2007 (JP) ................................ 2007-073540

(51) Int. Cl.

| | |
|---|---|
| ***G06F 3/12*** | (2006.01) |
| ***G06K 15/00*** | (2006.01) |
| ***H04N 1/00*** | (2006.01) |
| ***G03G 15/00*** | (2006.01) |
| ***G03G 21/00*** | (2006.01) |
| ***B65H 43/00*** | (2006.01) |
| ***B65H 39/10*** | (2006.01) |

(52) U.S. Cl.
USPC ........ 358/1.15; 358/1.13; 358/1.14; 358/400; 358/401; 358/403; 399/8; 399/16; 399/82; 399/407; 399/75; 271/176; 271/298; 271/294; 271/292

(58) Field of Classification Search
USPC ............ 358/1.12, 1.14, 1.15, 403, 1.13, 400, 358/401; 399/407, 16, 82, 75, 8; 271/298, 271/292, 294, 176
See application file for complete search history.

(56) References Cited

U.S. PATENT DOCUMENTS 5,021,837 A 6/1991 Uto et al. ..................... 355/322
5,137,265 A 8/1992 Sato et al. ...................... 270/53
(Continued)

FOREIGN PATENT DOCUMENTS

DE 19855191 6/2000
EP 0692599 1/1996
(Continued)

OTHER PUBLICATIONS

Korean Office Action dated Apr. 8, 2011, issued in counterpart Korean patent application No. 10-2009-7021207.

(Continued)

*Primary Examiner* — Firmin Backer
*Assistant Examiner* — Jonathan Beckley
(74) *Attorney, Agent, or Firm* — Fitzpatrick, Cella, Harper & Scinto

(57) ABSTRACT

A printing system includes, for example, a printing apparatus which forms an image on a sheet, and a plurality of dollies which are assigned different dolly identification information and used to stack the sheet discharged from the discharging port of the printing apparatus. The printing system also includes a designation unit which designates a dolly to be used for a print job, and an output unit which outputs alert information when the dolly designated by the designation unit is not allocated at the discharging port.

17 Claims, 34 Drawing Sheets

(56) References Cited

U.S. PATENT DOCUMENTS

| | | | | | |
|---|---|---|---|---|---|
| 5,203,552 | A | | 4/1993 | Hoshi et al. | 271/9 |
| 5,385,340 | A | | 1/1995 | Hiroi et al. | 270/53 |
| 5,390,016 | A | | 2/1995 | Hoshi et al. | 355/308 |
| 5,525,031 | A | * | 6/1996 | Fox | 414/789.7 |
| 5,647,056 | A | * | 7/1997 | Barrett et al. | 709/220 |
| 5,897,250 | A | | 4/1999 | Hirai et al. | 399/404 |
| 6,192,295 | B1 | | 2/2001 | Gunther | |
| 6,421,582 | B1 | | 7/2002 | Wada | |
| 6,481,703 | B2 | * | 11/2002 | Yoshida et al. | 270/58.08 |
| 6,751,425 | B2 | | 6/2004 | Fujimori et al. | 399/69 |
| 6,912,061 | B1 | * | 6/2005 | Ozaki | 358/1.15 |
| 7,031,000 | B1 | * | 4/2006 | Kim | 358/1.1 |
| 7,106,461 | B2 | * | 9/2006 | Kakigi et al. | 358/1.12 |
| 7,697,150 | B2 | * | 4/2010 | Smith et al. | 358/1.14 |
| 7,843,584 | B2 | * | 11/2010 | Nishikata et al. | 358/1.15 |
| 7,855,792 | B2 | * | 12/2010 | Nonaka | 358/1.13 |
| 7,884,955 | B2 | * | 2/2011 | Hull et al. | 358/1.15 |
| 7,945,346 | B2 | * | 5/2011 | Biegelsen et al. | 700/116 |
| 7,995,236 | B2 | * | 8/2011 | Hoshi et al. | 358/1.5 |
| 8,102,555 | B2 | * | 1/2012 | Nishikata et al. | 358/1.15 |
| 8,145,118 | B2 | * | 3/2012 | Seto | 399/406 |
| 8,607,102 | B2 | * | 12/2013 | Sampath et al. | 714/46 |
| 2004/0190057 | A1 | | 9/2004 | Takahashi et al. | 358/1.15 |
| 2007/0109586 | A1 | * | 5/2007 | Yamada et al. | 358/1.14 |

FOREIGN PATENT DOCUMENTS

| | | | |
|---|---|---|---|
| JP | 63-151013 | | 10/1988 |
| JP | 06-144520 | A | 5/1994 |
| JP | 11-282534 | | 10/1999 |
| JP | 2002-086854 | A | 3/2002 |
| JP | 2002-318970 | A | 10/2002 |
| JP | 2003-128207 | | 5/2003 |
| JP | 2004-310747 | | 11/2004 |
| JP | 2005-104707 | | 4/2005 |
| JP | 2006-40125 | | 2/2006 |
| JP | 2006-113973 | A | 4/2006 |
| JP | 2006-202214 | A | 8/2006 |

OTHER PUBLICATIONS

Official Communication dated Feb. 29, 2012, issued by the European Patent Office, in European Patent Application No. 08722071.1.

International Search Report and Written Opinion of PCT/JP2008/054673.

Japanese Office Action dated Oct. 17, 2011, issued in Japanese Application No. 2007-073540.

* cited by examiner

FIG. 10

1000

| ANTENNA NO. | ANTENNA NAME | DOLLY NO. | USE STATUS |
|---|---|---|---|
| 1 | PRINTING SYSTEM | – | – |
| 2 | SHEET STORAGE SITE | 9 | UNUSED |
| 3 | PRODUCT STORAGE SITE | 1 | UNUSED |
| 3 | PRODUCT STORAGE SITE | 10 | IN USE |
| 4 | BOOKBINDING APPARATUS | 7 | IN USE |
| 5 | PAPER FOLDING APPARATUS | 3 | UNUSED |
| 5 | PAPER FOLDING APPARATUS | 8 | IN USE |
| 6 | SADDLE STITCHING APPARATUS | 4 | UNUSED |
| 7 | PUNCHING APPARATUS | 5 | IN USE |
| 11 | STACKER 1 | 2 | IN USE |
| 12 | STACKER 2 | – | – |

F I G. 11

1100

| DOLLY NO. | USE STATUS | PLACE |
|---|---|---|
| 1 | UNUSED | PRODUCT STORAGE SITE |
| 2 | IN USE | STACKER 1 |
| 3 | UNUSED | PAPER FOLDING APPARATUS |
| 4 | UNUSED | SADDLE STITCHING APPARATUS |
| 5 | IN USE | PUNCHING APPARATUS |
| 6 | – | – |
| 7 | IN USE | BOOKBINDING APPARATUS |
| 8 | IN USE | PAPER FOLDING APPARATUSS |
| 9 | UNUSED | SHEET STORAGE SITE |
| 10 | IN USE | PRODUCT STORAGE SITE |

FIG. 21

800

| ANTENNA NO. | ANTENNA NAME | SYSTEM NO. | DOLLY NO. | USE STATUS |
|---|---|---|---|---|
| 1 | PRINTING SYSTEM | – | – | – |
| 2 | SHEET STORAGE SITE | 1 | 9 | UNUSED |
| 3 | PRODUCT STORAGE SITE | 1 | 1 | UNUSED |
| 3 | PRODUCT STORAGE SITE | 1 | 10 | IN USE |
| 4 | BOOKBINDING APPARATUS | 1 | 7 | IN USE |
| 5 | PAPER FOLDING APPARATUS | 1 | 3 | UNUSED |
| 5 | PAPER FOLDING APPARATUS | 1 | 8 | IN USE |
| 6 | SADDLE STITCHING APPARATUS | 1 | 4 | UNUSED |
| 7 | PUNCHING APPARATUS | 1 | 5 | IN USE |
| 11 | STACKER 1 | 1 | 2 | IN USE |
| 12 | STACKER 2 | – | – | – |

FIG. 22

900

| SYSTEM NO. | DOLLY NO. | USE STATUS | PLACE |
|---|---|---|---|
| 1 | 1 | UNUSED | PRODUCT STORAGE SITE |
| 1 | 2 | IN USE | STACKER 1 |
| 1 | 3 | UNUSED | PAPER FOLDING APPARATUS |
| 1 | 4 | UNUSED | SADDLE STITCHING APPARATUS |
| 1 | 5 | IN USE | PUNCHING APPARATUS |
| 1 | 6 | – | – |
| 1 | 7 | IN USE | BOOKBINDING APPARATUS |
| 1 | 8 | IN USE | PAPER FOLDING APPARATUSS |
| 1 | 9 | UNUSED | SHEET STORAGE SITE |
| 1 | 10 | IN USE | PRODUCT STORAGE SITE |

PRINTING SYSTEM, PRINTING APPARATUS, AND DOLLY DESIGNATION METHOD

TECHNICAL FIELD

The present invention relates to a printing system using a dolly on which image-formed printing paper sheets are stacked, a printing apparatus, and a dolly designation method.

BACKGROUND ART

Conventionally, there is a printing system which stacks, on a dolly prepared at the discharging port, printing paper sheets continuously output from a printer and causes the dolly to convey the bundle of printing paper sheets to a post-processing apparatus for executing post-processes such as punch, fold, and bookbinding. In this printing system, however, the operation of preparing the dolly at the discharging port puts a heavy load on the worker (operator).

To lighten the load on the operator, an automatic dolly supply/discharge method has been proposed, which sets a dolly without stacked printing paper sheets on standby upstream the discharging port and causes the dolly in the standby state to thrust out another dolly having stacked printing paper sheets (Japanese Patent Laid-Open No. 2005-104707).

In addition to a rotary duplicator capable of ensuring a waiting place to make a number of dollies on standby, as in Japanese Patent Laid-Open No. 2005-104707, a compact printing apparatus oriented to POD (Print On Demand) is recently widespread on the market. It appears to be difficult for such a printing apparatus to ensure a wide waiting place. If a sufficiently wide waiting place cannot be ensured, various problems arise.

For example, when a printing apparatus executes print jobs from a plurality of operators in parallel, mixed stack occurs so that printing paper sheets for the respective operators are stacked on a single dolly. In this case, each operator must manually distinguish printing paper sheets for himself/herself from a lot of printing paper sheets stacked on the dolly upon mixed stack, and this operation is cumbersome. Particularly when printing paper sheets discharged from the printing apparatus should further undergo post-processes, it is preferable to avoid mixed stack of printing paper sheets as much as possible.

DISCLOSURE OF INVENTION

It is a feature of the present invention to prevent printing paper sheets for different operators from inconveniently being stacked on a single dolly. Further features of the present invention will become apparent from the overall specification.

A printing system of the present invention includes, for example, a printing apparatus which forms an image on a printing paper sheet, and a plurality of dollies which are assigned different dolly identifications and used to stack the printing paper sheet discharged from the discharging port of the printing apparatus. The printing system also includes a designation unit which designates a dolly to be used for the print job form among a plurality of dollies which are assigned different dolly identification information and used to stack a sheet discharged from a discharging port of the printing apparatus. A detection unit detects dolly identification information of a dolly allocated at the discharging port. A notification device notifies a user to information. A control unit causes the notification device to notify the user that the dolly designated by the designation unit is not allocated at the discharging port when the detection unit does not detect the dolly identification information of the dolly designated by the designation unit.

Further features of the present invention will become apparent from the following description of exemplary embodiments (with reference to the attached drawings).

BRIEF DESCRIPTION OF DRAWINGS

FIG. 10 is a view showing an example of a current location management table;

FIG. 11 is a view showing an example of the current location management table after sort;

FIG. 21 is a view showing an example of a dolly management list;

FIG. 22 is a view showing another example of the dolly management list;

BEST MODE FOR CARRYING OUT THE INVENTION

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

[First Embodiment]

A printing system according to this embodiment comprises a printing apparatus including a digital copying machine and two large capacity stackers, post-processing apparatuses, and antennas. The printing apparatus may be called an image forming apparatus, printer, copying machine, or multi-functional peripheral. The post-processing apparatuses include, for example, a paper folding apparatus, saddle stitching apparatus, bookbinding apparatus, and punching apparatus.

Figure 1:
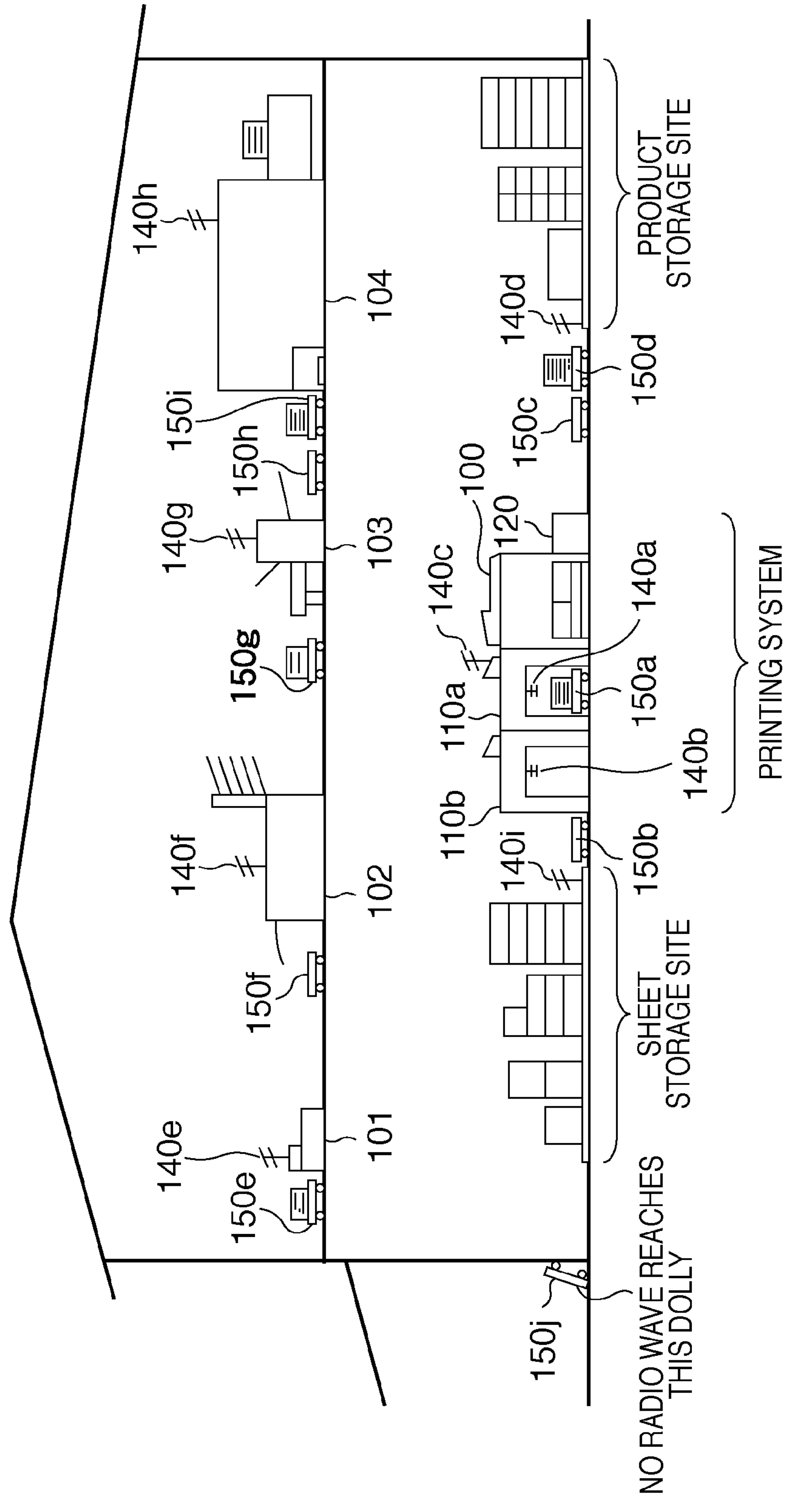
FIG. 1 is a view for explaining the outline of a printing system according to an embodiment.

FIG. 1 is a view for explaining the outline of the printing system according to this embodiment. FIG. 1 particularly illustrates a printing system installed in a print shop. Alphabetical suffixes (e.g., a to z) added to reference numerals identify dollies or antennas having identical arrangements. Any matter common to all dollies or the like will be described without the suffixes.

The printing system includes a printing apparatus 100, stackers 110*a* and 110*b*, deck 120, RFID antennas 140*a*, 140*b*, and 140*c*, and dolly 150*a*. An RFID antenna 140 is a communication unit for communicating with a communication device (e.g., RFID tag) on board of each dolly. An RFID (Radio Frequency Identification) tag is an IC tag which has an identification embedded and sends or receives information by wireless communication using an electromagnetic field or radio wave. A dolly 150 is a dolly on which printing paper sheets discharged from the discharging port of the printing apparatus are stacked. That is, the dolly is used in a print job. The printing paper sheet is also called a printing material, printing medium, paper, sheet, transfer material, or transfer paper.

The dolly 150*b* is on standby near the stacker 110*b*. The printing apparatus 100 communicates with dollies located in the coverage of radio waves via the RFID antennas 140*a*, 140*b*, and 140*c*. The coverage of radio waves generally equals a communicable range. The RFID antenna 140 is merely an example of an antenna apparatus. In the present invention, any other antenna apparatus using a standard except RFID is usable if it can provide a communicable range to identify the current location of each dolly.

A punching apparatus 101, saddle stitching apparatus 102, paper folding apparatus 103, and bookbinding apparatus 104 are installed on the second floor of the print shop. An RFID antenna 140*e* provided on the punching apparatus 101 can communicate with a dolly 150*e* located within its communicable range. An RFID antenna 140*f* provided on the saddle stitching apparatus 102 can communicate with a dolly 150*f* located within its communicable range. An RFID antenna 140*g* provided on the paper folding apparatus 103 can communicate with a dolly 150*g* located within its communicable range. An RFID antenna 140*h* provided on the bookbinding apparatus 104 can communicate with dollies 150*h* and 150*i* located within its communicable range.

An RFID antenna 140*i* is installed in a sheet storage site. An RFID antenna 140*d* is installed in a product storage site, which can communicate with dollies 150*c* and 150*d* located within its communicable range. All antennas cannot communicate with a dolly 150*j* located outdoors because it exists outside the communicable ranges of all antennas. Each RFID antenna 140 is connected to the printing apparatus 100 via a network or cable. Hence, the printing apparatus 100 can communicate with all antennas and grasp their current locations by specifying antennas that can communicate with dollies. For example, when the RFID antenna 140*e* can communicate with the dolly 150*e*, the printing apparatus 100 can recognize that the dolly 150*e* is located near the punching apparatus 101.

Figure 2:
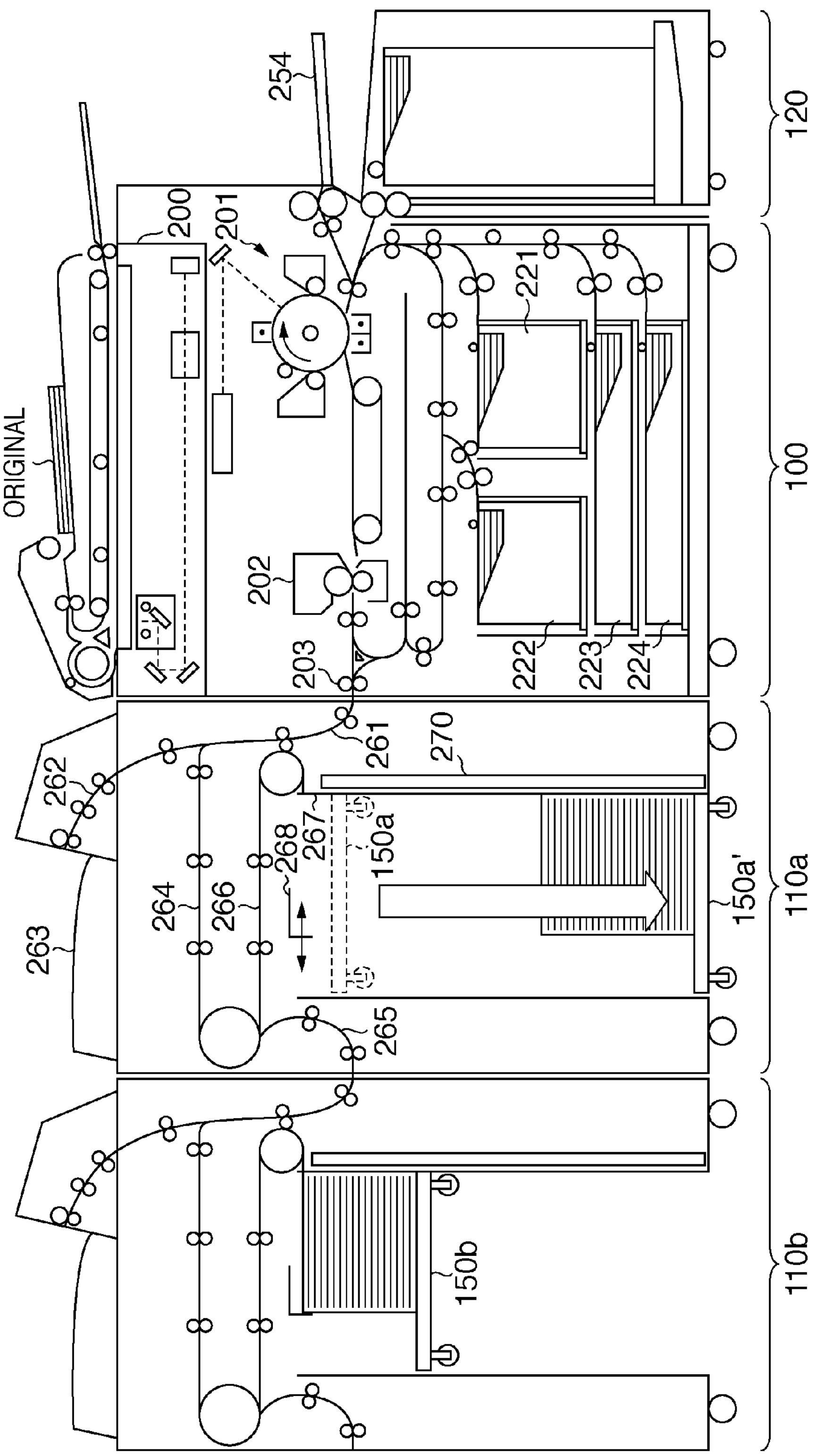
FIG. 2 is a view showing the general arrangements of a printing apparatus and a stacker.

FIG. 2 is a view showing the general arrangements of the printing apparatus and the large capacity stacker. The printing apparatus 100 is, for example, the main body of a digital copying machine. A reader unit 200 for reading a document reads an image of a document fed by, for example, an automatic document feeder (ADF).

An image forming unit 201 image-forms on a printing paper sheet based on the image read by the reader unit 200. In, for example, an electrophotographic method, an image by a developer (e.g., toner) is transferred onto a printing paper sheet. A fixing unit 202 fixes the unfixed image on the printing paper sheet. Then, discharging rollers 203 discharge the printing paper sheet to the stacker 110*a*.

The printing paper sheets are stored in a right cassette deck 221, left cassette deck 222, upper cassette 223, or lower cassette 224. The printing apparatus 100 also has an optional deck 120 capable of storing 3,500 printing paper sheets. The printing apparatus 100 also has a multi-manual feeding unit 254 capable of storing 50 printing paper sheets. The number of printing paper sheets is merely an example.

Referring to FIG. 2, the stackers 110*a* and 110*b* employ the same arrangement. The stacker 110*a* will be described here.

A printing paper sheet discharged from the printing apparatus 100 is received by a printing paper receiving unit 261 of the stacker 110*a* and conveyed to the downstream side. The stacker 110*a* discharges the printing paper sheet to a discharging destination (one of a sample tray 263, stack tray [dolly 150*a*], and downstream discharge [stacker 110*b*]) in accordance with an instruction from the printing apparatus 100.

If the discharging destination is the sample tray 263, the printing paper sheet is discharged to the sample tray 263 via a sample tray conveyance path 262. The sample tray 263 is used to discharge printing paper sheets which require no post-process or a small number of printing paper sheets as compared to a stack tray. For downstream discharge, the printing paper sheet is conveyed to the downstream stacker 110*b* via a horizontal conveying unit 264 and a downstream discharge conveying unit 265. For stack tray discharge, the printing paper sheet is discharged from a stack tray discharging port 267 via the horizontal conveying unit 264 and then a diagonal conveyance correction unit 266 and stacked on the dolly 150*a*. The dolly 150 function as a transportable stack tray for the stacker 110. The diagonal conveyance correction unit 266 corrects an inappropriate skew of a printing paper sheet during conveyance. A lengthwise stack guide 268 and a widthwise stack guide (not shown) move as indicated by an arrow in FIG. 2 with respect to the printing paper sheets stacked on the dolly 150*a*, thereby adjusting the stack position of the printing paper sheets.

A lifting device 270 gradually moves the dolly 150*a* downward every time a predetermined number of printing paper sheets are stacked. This aims at always aligning the uppermost plane of the bundle of printing paper sheets with the stack tray discharging port 267. The dolly 150*a* also moves down in accordance with a dolly pull-out instruction. Reference numeral 150*a*' indicates a dolly moved to the lowermost position. The dolly 150*a* has casters and can therefore be pulled out from the stacker 110*a* together with the stacked bundle of printing paper sheets. After removing the bundle of printing paper sheets, the dolly 150*a* is set in the stacker 110*a*. The lifting device 270 moves up the dolly 150*a* to align the upper plane of the dolly 150*a* with the stack tray discharging port 267. “Alignment” need not always be perfect alignment and allows a difference of elevation to easily stack printing paper sheets on the dolly. For example, the upper plane of the dolly 150*a* may be located below the stack tray discharging port 267 by a predetermined distance (e.g., 1 cm).

Instead of directly stacking printing paper sheets on the dolly 150*a*, a tray that moves up and down in place of the dolly 150*a* may be prepared to stack printing paper sheets on it. To transport the printing paper sheets, the tray is moved down and placed on the dolly 150*a* so that the dolly 150*a* transports the printing paper sheets together with the tray.

Figure 3:
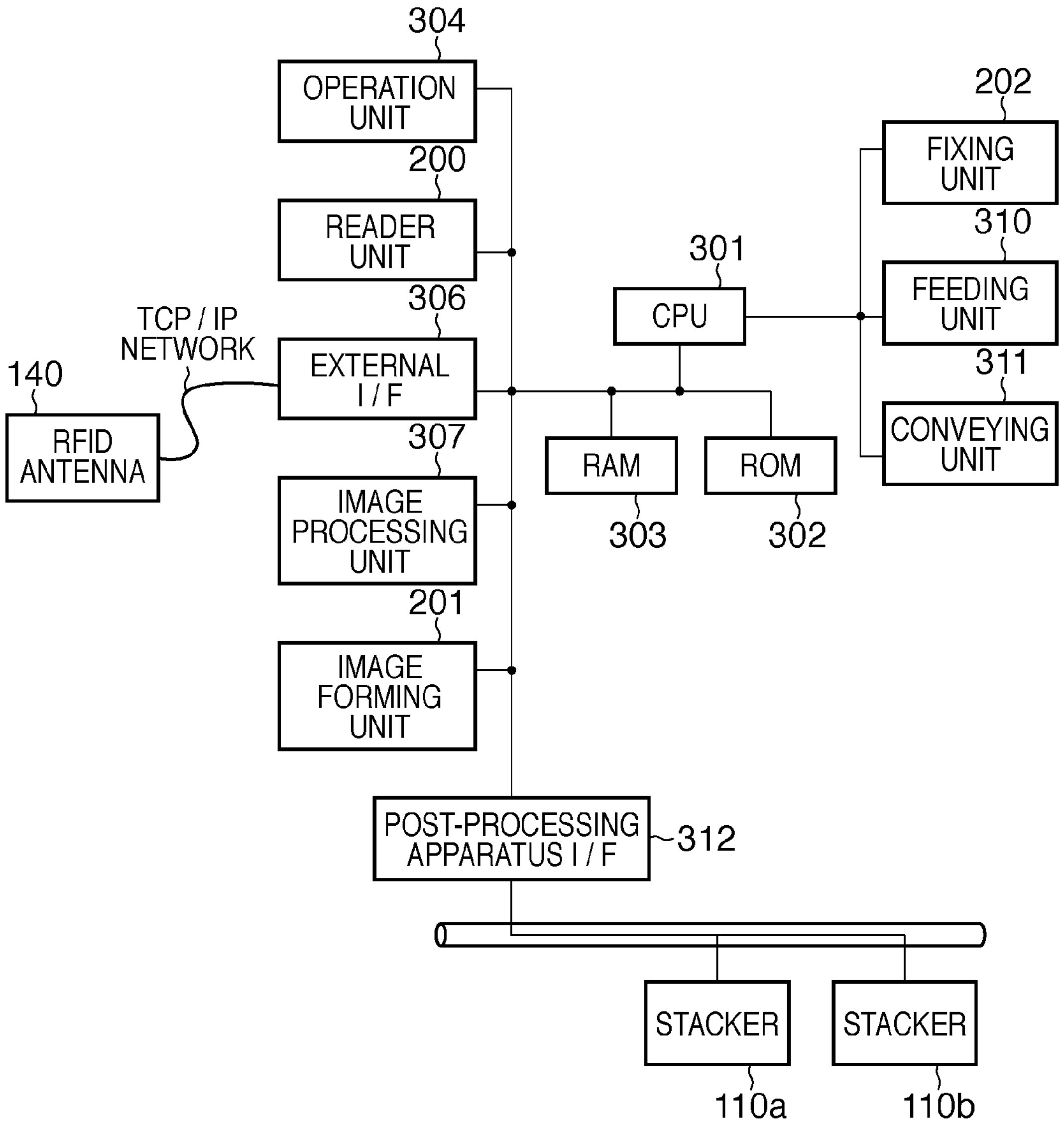
FIG. 3 is an exemplary block diagram of the printing apparatus.

FIG. 3 is an exemplary block diagram of the printing apparatus. A CPU 301 is a control unit which comprehensively controls the respective units of the printing apparatus 100. In this embodiment, the CPU 301 also functions as a display control unit for displaying the current location of each dolly on a display unit such as a liquid crystal display device.

A ROM 302 is a storage device which stores control contents (computer programs) to be executed by the CPU 301. A RAM 303 is a storage device used as a work area of the CPU 301. The RAM 303 stores, for example, the number of pages of each print job to be executed by the printing apparatus, the number of printing paper sheets stacked on the dolly allocated at the discharging port, the maximum number of printing paper sheets stackable on a dolly, and the threshold number of printing paper sheets which triggers display of the identified current location of each dolly. The RAM 303 may store a user management table, dolly management table (current location management table), and job management table. Each table will be described later in detail. The RAM 303 also functions as a storage unit for storing place information representing the installation place of each RFID antenna.

An operation unit 304 has an input device including switches and a touch panel, and a display device such as a liquid crystal display device. The operation unit 304 is used by, for example, a user to set a print job (e.g., copy job) to be executed by the printing apparatus 100. The display device of the operation unit 304 displays, for example, a message to prompt a user to prepare a dolly, or the current location of each dolly. The display device of the operation unit 304 also functions as a notification device for sending alert information or the like. The CPU 301 also functions as a control unit to send a notification of various kinds of information. The notification form need not always be display but can be voice output, print output, or transmission to another device.

An external I/F 306 is connected to a TCP/IP network to receive a print job execution instruction from a computer connected to the network or transmit internal information of the printing apparatus 100 to a computer. In this embodiment, the external I/F 306 also serves as a communication unit for communicating with each RFID antenna.

An image processing unit 307 executes settings of single-sided printing/double-sided printing, copy job settings such as enlargement/reduction, and image processing necessary for an image from the reader unit 200 and stores, in the RAM 303, an image to be formed.

A feeding unit 310 feeds a printing paper sheet stored in the right cassette deck 221 and the like. A conveying unit 311 conveys the printing paper sheet to the image forming unit 201 and fixing unit 202 to transfer and fix a toner image.

A post-processing apparatus I/F 312 is a communication unit for communicating with the stackers 110*a* and 110*b*. The CPU 301 transmits, for example, a discharging destination designation information or a downstream conveyance instruction to the stackers 110*a* and 110*b* via the post-processing apparatus I/F 312.

Figure 4:
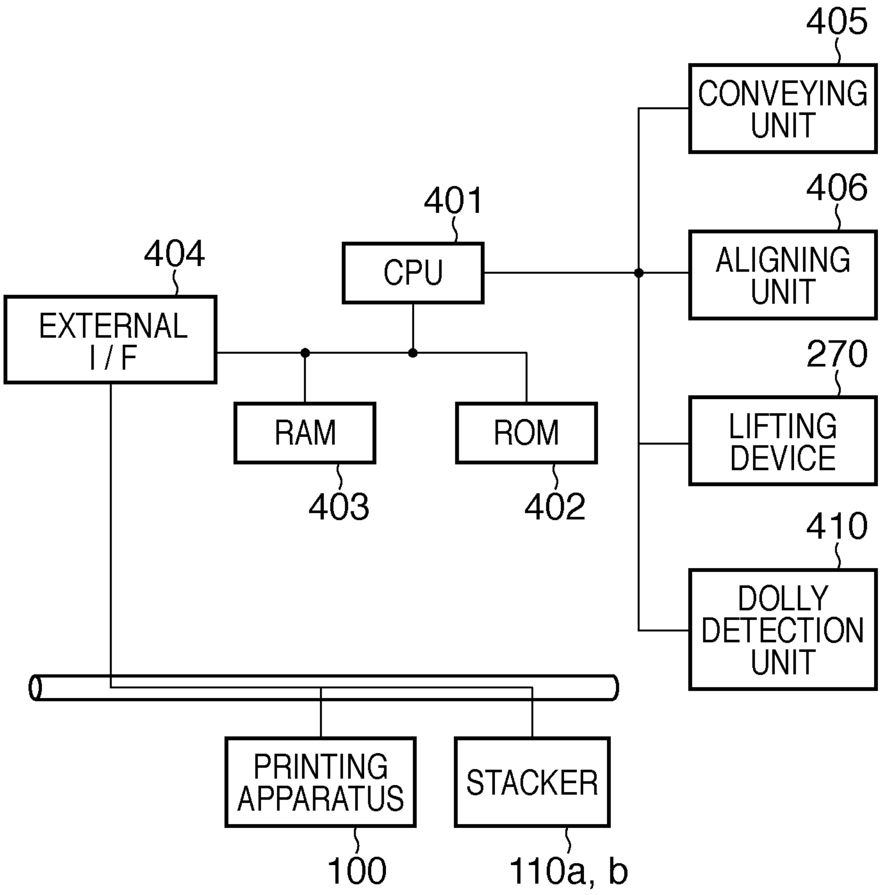
FIG. 4 is an exemplary block diagram of the stacker.

FIG. 4 is an exemplary block diagram of the stacker. A CPU 401 is a control unit which comprehensively controls the respective units of the stacker 110*a*. A ROM 402 is a storage device which stores control contents to be executed by the CPU 401. A RAM 403 is a storage device used as a work area of the CPU 401.

An external I/F 404 is an interface to connect the stacker 110*a* to the network of the printing apparatus 100 and other stackers. The CPU 401 is used to receive a printing paper sheet conveyance instruction or discharging destination designation information for the printing apparatus 100 or send a printing paper sheet transfer timing to another stacker via the external I/F 404. A dolly detection unit 410 is a detection unit for detecting whether a dolly is allocated at the discharging port. For example, the dolly detection unit 410 can be implemented by the RFID antenna 140*a* installed in the stacker. The CPU 401 can detect whether a dolly is allocated at the discharging port by setting the communicable range of the RFID antenna 140*a* to several tens cm. More specifically, the dolly detection unit 410 can detect that a dolly is allocated at the discharging port if communication with the dolly is possible, and that no dolly is allocated at the discharging port if communication is impossible. The dolly detection unit 410 may be a switch which is turned on upon allocating a dolly at the discharging port. The switch can be of a mechanical type, an optical type, or any other type.

Figure 5:
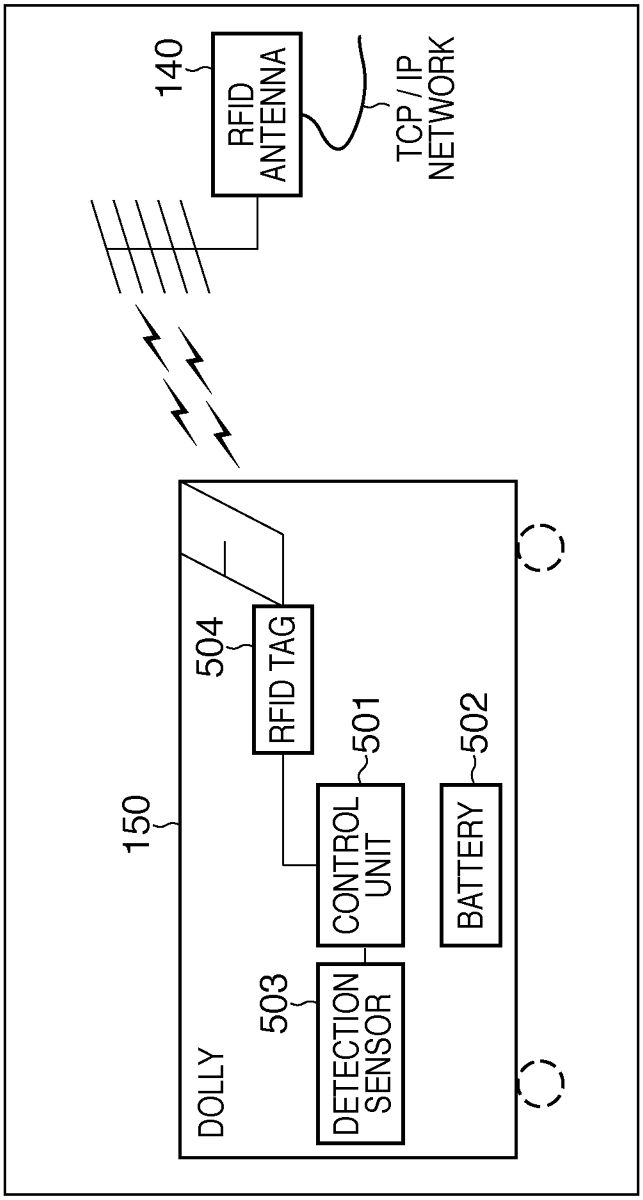
FIG. 5 is an exemplary block diagram of a dolly.

FIG. 5 is an exemplary block diagram of a dolly. A control unit 501 controls the respective units of the dolly and includes a CPU, ROM, and RAM. A battery 502 is a power supply unit for supplying necessary power to the control unit 501. A detection sensor 503 is a detection unit for detecting the use status of the dolly (e.g., whether printing paper sheets are stacked on the dolly). The detection sensor 503 is an example of a printing paper sheet detection unit for detecting a printing paper sheet stacked on the dolly. The result (status information) detected by the detection sensor 503 is sent, via the control unit 501, to an RFID tag 504 which functions as a communication unit.

The RFID tag 504 is a communication device mounted on each dolly. The control unit 501 sends, for example, a unique identification (e.g., dolly number) to identify the dolly 150 to the RFID tag 504. Notification from the control unit 501 is unnecessary if the memory (e.g., flash memory) of the RFID tag 504 stores a unique identification number or the like. The RFID tag 504 also functions as a transmission unit for transmitting an identification number or status information to the RFID antenna 140 connected to the printing apparatus 100. The RFID tag 504 is also called a wireless tag, wireless IC tag, or wireless semiconductor tag.

Figure 6:
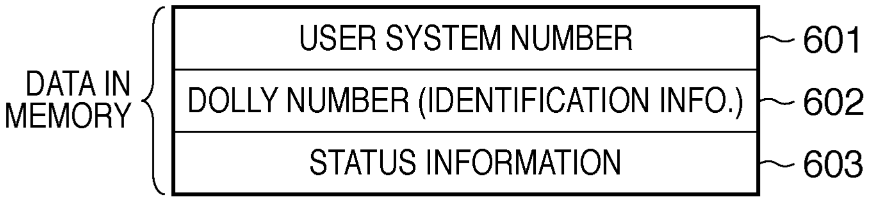
FIG. 6 is a view showing an example of the structure of data stored in the memory of an RFID tag.

FIG. 6 is a view showing an example of the structure of data stored in the memory of the RFID tag. A user number 601 and a dolly number 602 are unique identifications to identify an operator and a dolly, respectively. The user number 601 is an example of a user identification assigned to each operator. The dolly number 602 is an example of a dolly identification assigned to each dolly. The memory of the RFID tag may store system number with/without the user number 601. The system number is unique identifications to identify a printing system to which the dolly belongs. The system number is an example of a printing system identification assigned to each printing system.

Status information 603 indicates a use status of a dolly, and for example, whether the dolly is used, that is, whether printing paper sheets are stacked on the dolly. For example, when the detection sensor 503 detects a printing paper sheet, the control unit 501 writes status information indicating "printing paper sheet exists" in the memory of the RFID tag 504. The system number, user number 601 and status information 603 are normally changeable while the dolly number 602 is normally fixed.

The RFID antenna 140 includes a wireless communication unit for communicating with the RFID tag 504, a control unit, and a network communication unit for communicating with the printing apparatus 100 via the TCP/IP network. Upon receiving a radio wave transmitted from the RFID antenna 140, the RFID tag 504 reads out the user number 601, the system number, dolly number 602, and status information 603 from the memory and returns them to the RFID antenna 140. The RFID antenna 140 can communicate with the dolly 150 located within the wireless communicable range (a range of a several-meter radius from the RFID antenna 140). It is therefore possible to specify the current location of the dolly 150 by detecting the installation place of the RFID antenna 140 that can communicate with the dolly 150. The wireless communicable range is normally a circle with a radius of several meters. However, the RFID antenna 140 can have any size and shape as far as the current location of the dolly 150 can be specified. The wireless communicable range is preferably relatively narrow (e.g., 10 m or less), as a matter of course, so that an operator can easily find an unused dolly. The communicable range of each RFID antenna may change depending on the installation place.

The CPU 301 of the printing apparatus 100 functions as an obtaining unit for obtaining the current location or status information of the dolly 150 by communicating with each RFID antenna 140 via the external I/F 306. That is, the CPU 301 of the printing apparatus 100 or the RFID antenna 140 also functions as a location identification unit for identifying the current location of each dolly. The CPU 301 displays the identified current location of each dolly on the display device (e.g., FIG. 12) of the operation unit 304. When the current location of each dolly is displayed on the display device, the operator can easily find a dolly.

Figure 7:
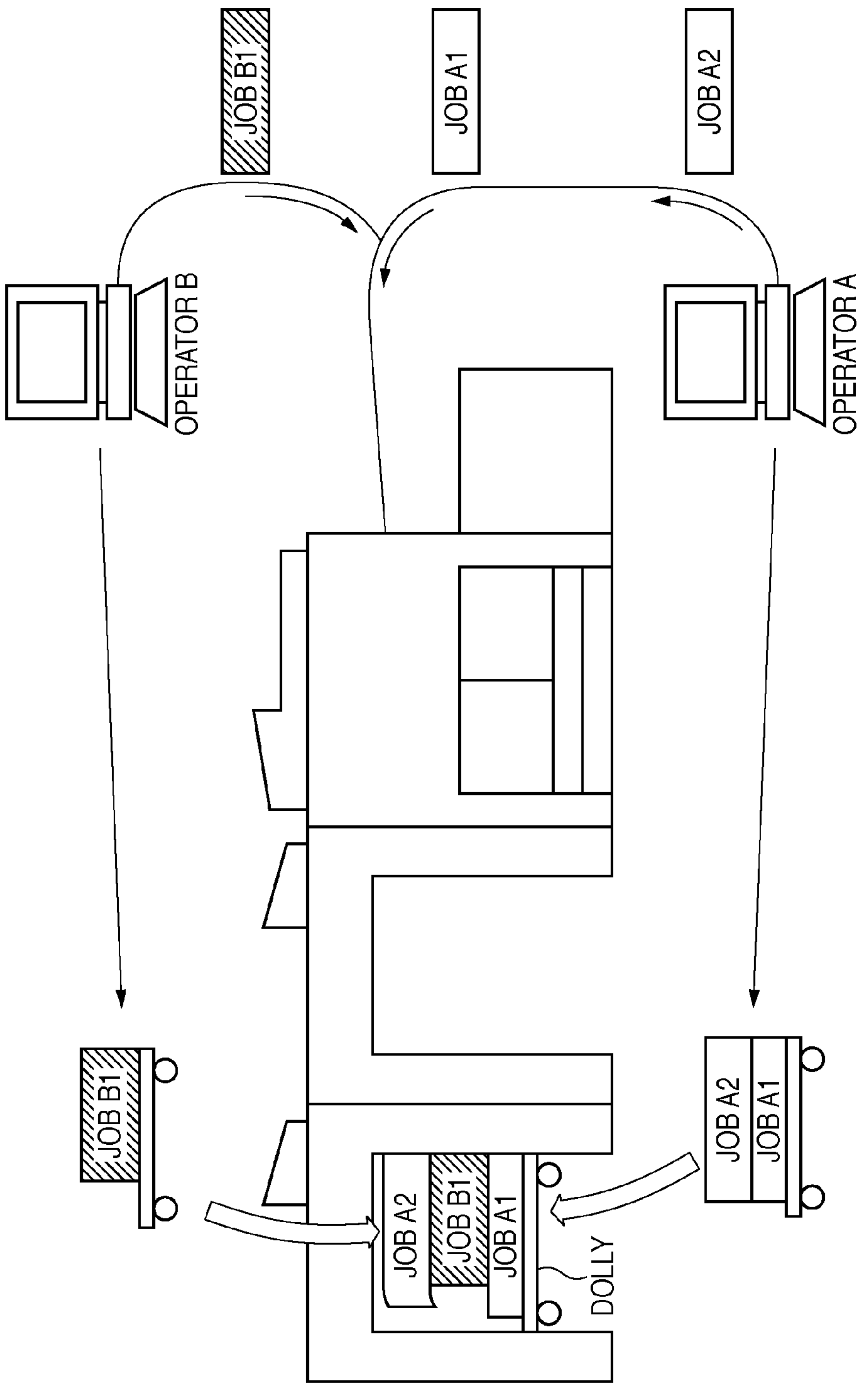
FIG. 7 is a view for explaining a problem of the present invention.

FIG. 7 is a view for explaining a problem of the present invention. In a printing system without application of the present invention, when two operators A and B enter print jobs, mixed stack may occur to stack printing paper sheets for the two operators on a single dolly.

For example, assume that the operator A continuously enters execution instructions of jobs A1 and A2 in the printing apparatus. Assume that the operator B enters an execution instruction of a job B1 in the printing apparatus. At this time, the operator A expects that the printing paper sheets of the job A1 and those of the job A2 are stacked on the dolly in order. On the other hand, the operator B expects that the printing paper sheets of the job B1 are stacked on the dolly.

Assume that when the two operators enter the execution instructions at almost the same timing, the printing apparatus receives the job A1, job B1, and job A2 in this order. These jobs set the same stack tray as the discharging destination, and so-called mixed stack occurs. More specifically, the printing paper sheets of the job A1, the printing paper sheets of the job B1, and the printing paper sheets of the job A2 are stacked on the dolly in this order.

If mixed stack occurs, and printing paper sheets for a plurality of operators are stacked on one dolly, the dolly transfer operation between the operators is complicated, and the operation efficiency lowers. The dolly transfer operation readily occurs in, for example, executing post-processes.

Figure 8A:
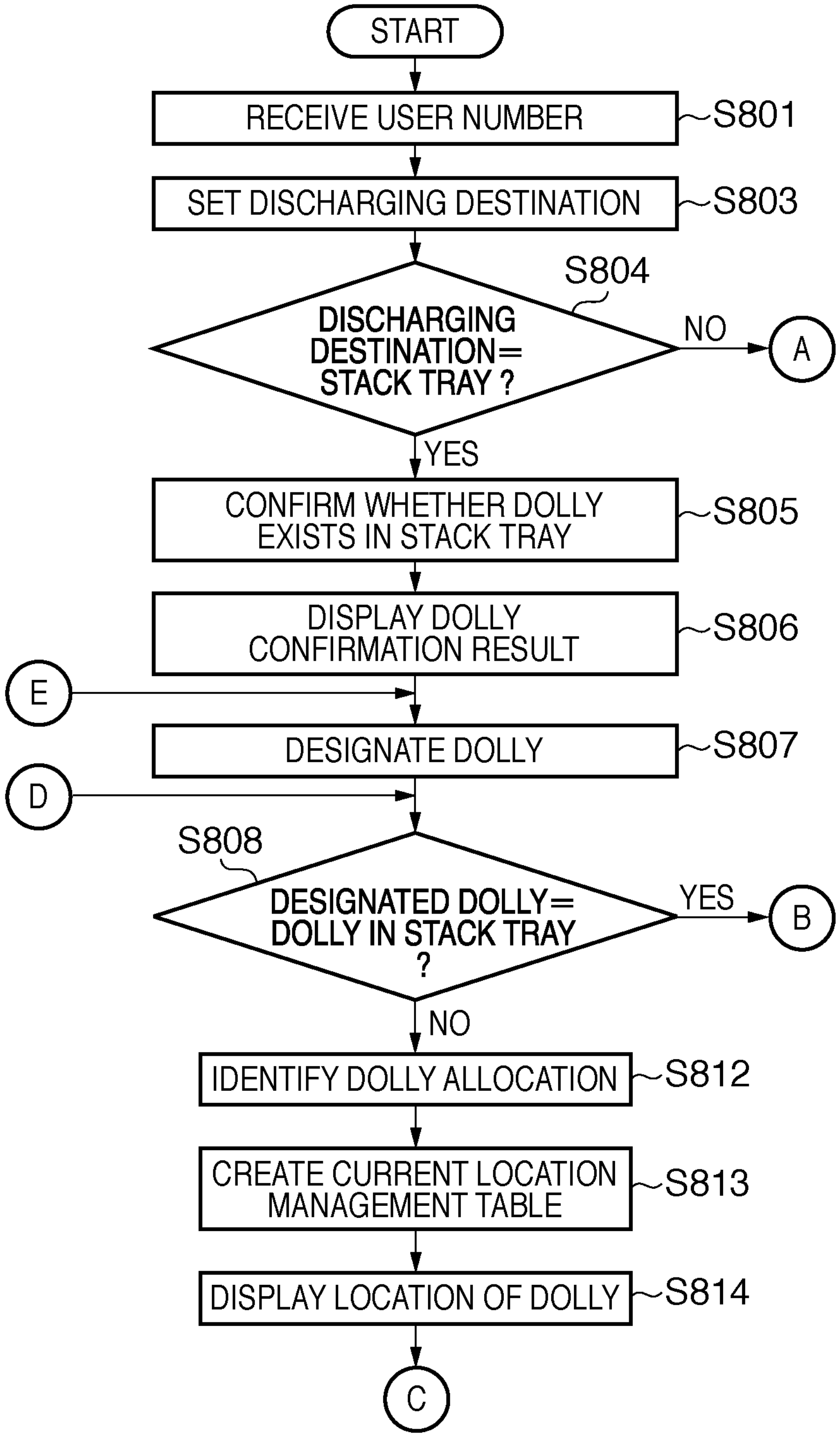
FIGS. 8A and 8B are exemplary flowcharts illustrating a dolly designation method executed as part of print processing.
Figure 8B:
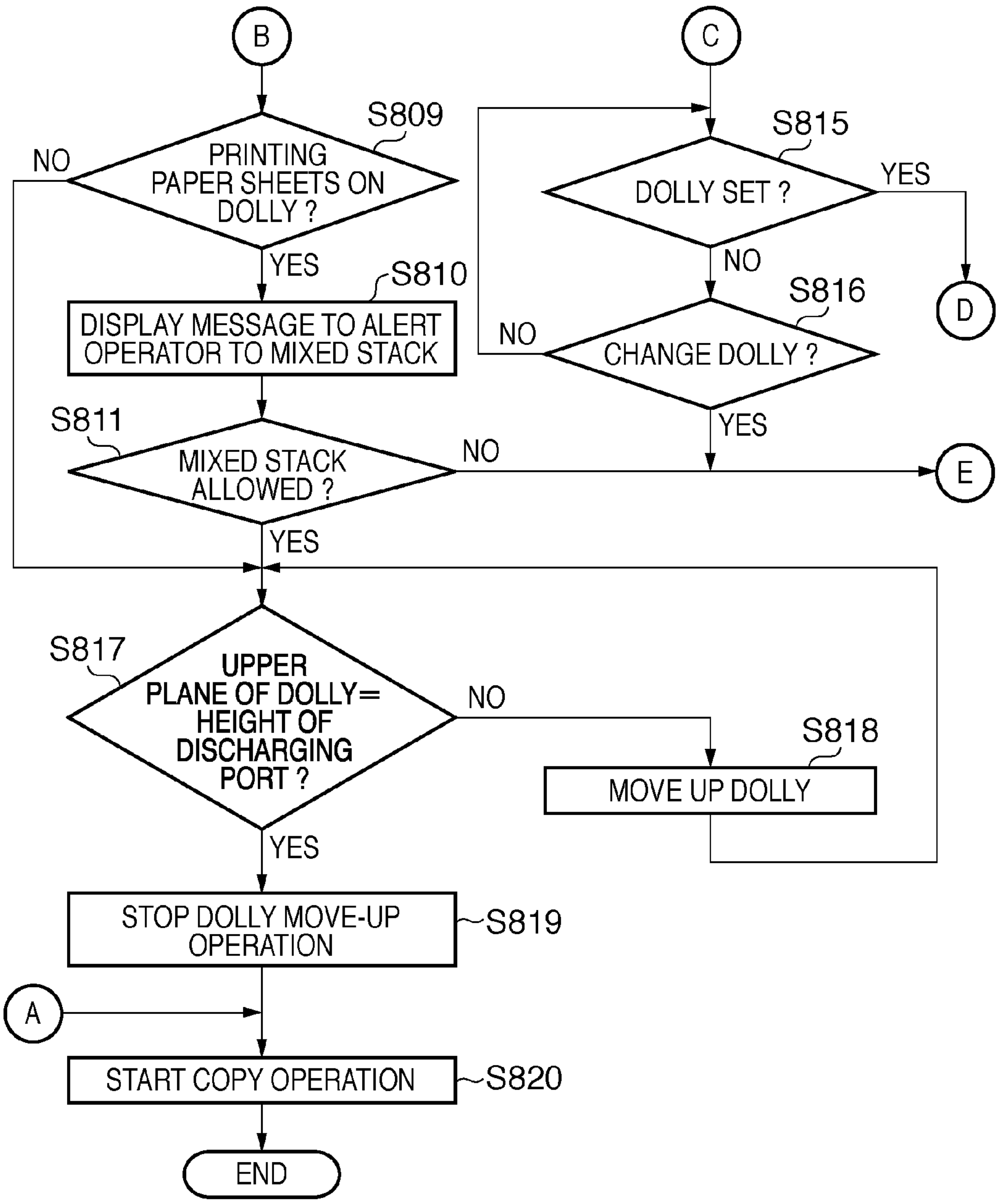

FIGS. 8A and 8B are exemplary flowcharts illustrating a dolly designation method executed as part of print processing. As a characteristic feature of this method, one of a plurality of dollies is designated to stack printing paper sheets, and alert information is output if the designated dolly is not allocated at the discharging port.

In step S801, the CPU 301 receives a user number input from the operation unit 304. That is, the CPU 301 or operation unit 304 functions as a reception unit for receiving the user identification of an operator who wants to use the printing apparatus. The user number can include characters such as "A" except numbers. In step S803, the CPU 301 sets the printing paper sheet discharging destination in accordance with information input from the operation unit 304. The discharging destination is, for example, one of the stack tray and sample tray of the stacker 110*a* and the stack tray and sample tray of the stacker 110*b*.

In step S804, the CPU 301 determines whether the set discharging destination is a stack tray. That is, the CPU 301 determines whether a dolly is designated as the discharging destination. If the discharging destination is not a stack tray, the process advances to step S820, and the CPU 301 starts a print job (e.g., copy job). If the discharging destination is a stack tray, the process advances to step S805.

In step S805, the CPU 301 confirms whether the dolly 150 is allocated in the stack tray set as the discharging destination. The CPU 401 of the dolly 150 causes the dolly detection unit 410 to determine, spontaneously or in response to an inquiry from the CPU 301, whether a dolly is allocated in the stack tray of a stacker 110. The dolly detection unit 410 starts wireless communication with the RFID tag 504 of the dolly 150 via the RFID antenna 140 arranged in the stack tray. If necessary data is received from the RFID tag 504, the dolly detection unit 410 determines that a dolly exists in the stack tray. If necessary data is not received, the dolly detection unit 410 determines that no dolly exists in the stack tray. The necessary data includes the user number 601, dolly number 602, and status information 603. The CPU 401 causes the dolly detection unit 410 to transmit the dolly detection result to the CPU 301. The CPU 301 executes the above-described confirmation process in accordance with the received detection result.

In step S806, the CPU 301 displays the confirmation result about the dolly on the display device of the operation unit 304. In step S807, the CPU 301 designates (reserves) one of the plurality of dollies to stack printing paper sheets in accordance with information (e.g., dolly number) input from the operation unit 304. This aims at preventing mixed stack of printing paper sheets of another job unexpected by the operator.

For example, the ROM 302 or RAM 303 stores a user management table. The user management table manages the user identification of each operator and the dolly identification of a dolly whose use is allowed for the operator in association with each other. The CPU 301 reads out, from the user management table, dolly identification corresponding to the user identification received in step S801 and displays the readout dolly identification on the display device of the operation unit 304 as a designation candidate. In this way, one or more usable dollies can be decided for each operator.

In step S807, the CPU 301 designates one of the plurality of dollies to stack printing paper sheets in accordance with information input from the operation unit 304. For example, the operator executes an operation of selecting a desired dolly from designation candidates displayed on the display device of the operation unit 304. In this way, a dolly to be used is designated for each job.

Figure 9:
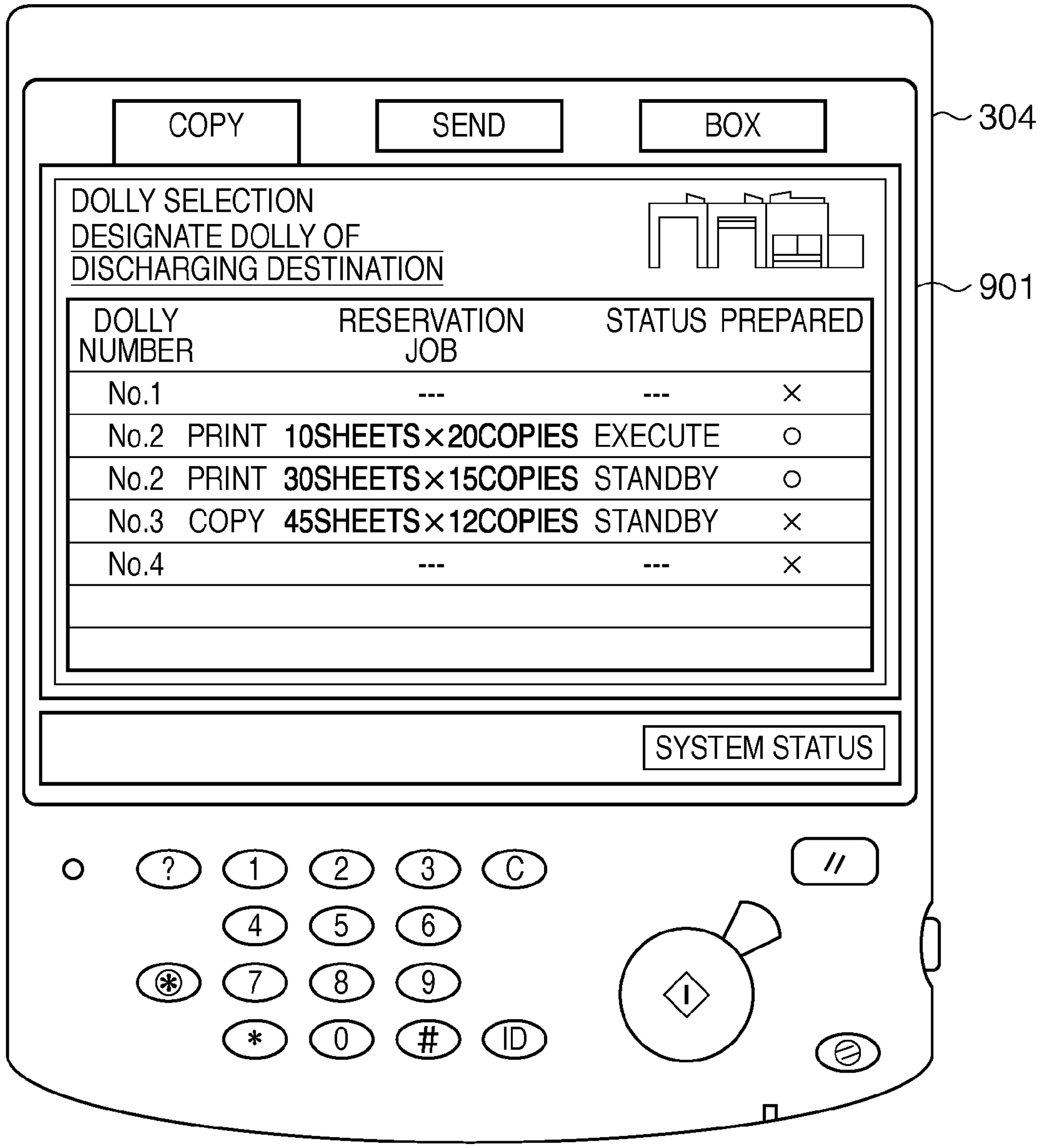
FIG. 9 is a view showing an example of the display contents of an operation unit.

FIG. 9 is a view showing an example of the display contents of the operation unit. A display device 901 provided on the operation unit 304 displays information of several dollies as discharging destination designation candidates. The display device 901 displays, for example, a dolly number, job type, reserved job name, information representing whether a job is being executed, and information representing whether preparation of a dolly is ended.

In this example, the stackers of the discharging destinations are displayed as icons on the upper right corner of the display screen. The operator A can use dollies Nos. 1 to 4. Two print jobs have been entered in dolly No. 2. One of the jobs is being executed, and the other is on standby. One copy job has been entered in dolly No. 3. The copy job is on standby.

The operator A selects a dolly to be used for the current job from the displayed designation candidates. For example, the display device 901 of the operation unit 304 has a touch-panel input device. The CPU 301 detects the dolly selected by the operator based on a signal from the input device.

In step S808, the CPU 301 determines whether the designated dolly matches the dolly allocated at the discharging port. For example, the CPU 301 determines whether the dolly number of the designated dolly matches the dolly number read out from the dolly allocated at the discharging port. The CPU 301 may determine whether the user number input in step S801 matches the user number read out from the dolly allocated at the discharging port. If the dollies match, the process advances to step S809. If the dollies do not match, the process advances to step S812.

In step S809, the CPU 301 determines whether printing paper sheets are stacked on the dolly allocated at the discharging port. As described above, the CPU 401 reads out the user number 601, dolly number 602, and status information 603 from the dolly and transfers them to the CPU 301. The received status information 603 contains information representing the presence/absence of printing paper sheets detected by the detection sensor 503. Hence, the CPU 301 can determine the presence/absence of printing paper sheets based on the status information 603.

The CPU 301 may confirm whether a reserved job that should be executed before the current job exists. The CPU 301 creates a reservation table and manages jobs reserved for the respective dollies. If a reserved job to be executed before the current job exists, printing paper sheets should be stacked on the dolly when the preceding reserved job is executed, although no printing paper sheets are stacked on the dolly at the present time. Hence, when a reserved job exists, the CPU 301 recognizes that printing paper sheets are stacked. If no printing paper sheets are stacked on the dolly, the process advances to step S817. If printing paper sheets are stacked on the dolly, the process advances to step S810.

In step S810, the CPU 301 outputs alert information to the display device 901 to alert the operator to mixed stack. This alert is done because the printing paper sheets of the current job would be stacked on the already stacked printing paper sheets. The CPU 301 may display, on the display device 901, a message to prompt the operator to pull out the dolly and remove the printing paper sheets on the dolly, although this procedure is not described in the flow. When the detection sensor 503 detects that the printing paper sheets on the dolly are removed, the process advances to step S817.

In step S811, the CPU 301 determines in accordance with information input from the operation unit 304 whether to allow mixed stack. For example, the CPU 301 outputs, to the display device 901, a message to ask the operator whether to allow mixed stack. The CPU 301 receives an instruction to allow or prohibit mixed stack, which is input by the operator from the operation unit 304. To prohibit mixed stack, the process returns to step S807, and the CPU 301 executes a process of designating the next dolly. To allow mixed stack, the process advances to step S817.

In step S817, the CPU 301 determines whether the upper plane of the dolly is aligned with the stack tray discharging port 267. If they are not aligned, the process advances to step S818, and the CPU 301 transmits a dolly move-up instruction to the CPU 401. The CPU 401 drives the lifting device 270 to move up the dolly. When the upper plane of the dolly moves up to be aligned with the stack tray discharging port 267, the process advances to step S819, and the CPU 301 stops the dolly move-up operation. The lifting device 270 has a detection mechanism for detecting the height of the dolly. The detected height information is transferred to the CPU 301 via the CPU 401. Then, the process advances to step S820.

As described above, if the dolly in the stack tray of the discharging destination does not match the designated dolly, the CPU 301 identifies the current location of each dolly in step S812. For example, the CPU 301 tries to communicate with each dolly via the RFID antenna 140.

In step S813, the CPU 301 creates a current location management table which associates the identification (corresponding to installation place information) of RFID antennas that have succeeded in communication with the dollies with various kinds of information read out from the RFID tags of the dollies.

FIG. 10 is a view showing an example of a current location management table. Antenna numbers, antenna names each representing an installation place, dolly numbers, and status information are registered in a current location management table 1000.

FIG. 11 is a view showing an example of the current location management table after sort. A current location management table 1100 after sort is obtained by sorting the dolly numbers in ascending order. As is apparent from FIG. 11, for example, dolly No. 1 has no printing paper sheets stacked and exists near the product storage site.

In step S814, the CPU 301 outputs the identified current location of each dolly to the display device 901. The CPU 301 may function as an extraction unit for extracting, from the current location management table, a current location corresponding to the dolly identification of the designated dolly. The CPU 301 may extract a dolly corresponding to the user identification of the operator. In this way, the CPU 301 outputs the extracted current location of each dolly to the display device 901. Since application of this extraction process enables to exclude dollies unusable by the operator A from the display target, the display becomes easy to understand.

Figure 12:
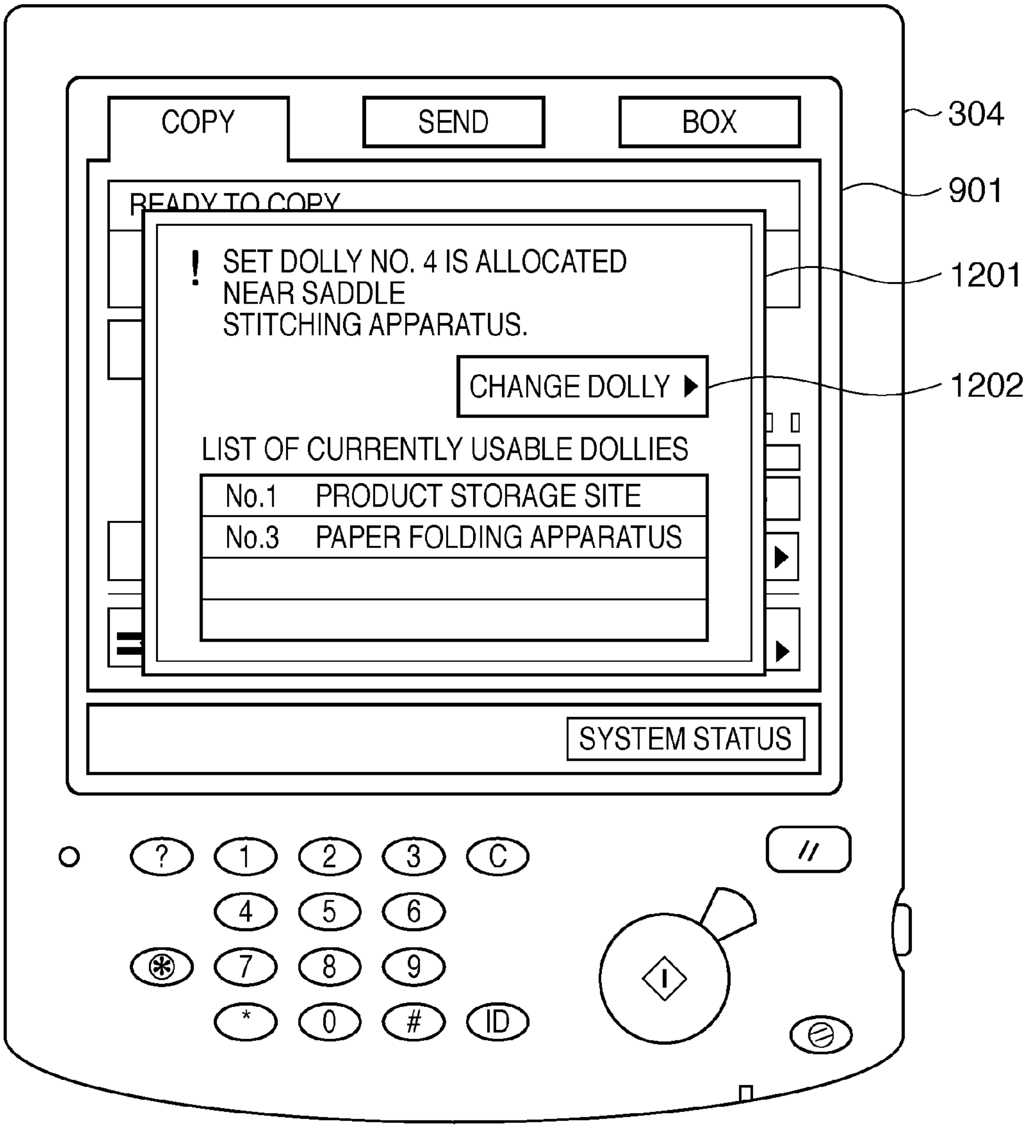
FIG. 12 is a view showing a display example of the current locations of dollies.

FIG. 12 is a view showing a display example of the current locations of dollies. According to this display example, a dialogue 1201 includes a message representing the current location of the designated dolly, and information (e.g., dolly numbers and current locations) of other usable dollies. In this display example, dollies such as dolly No. 9 unusable by the current operator A are excluded from the display target. Since the current location of each dolly is displayed, the operator A can easily retrieve the designated dolly in the shop. This increases the operation efficiency and shortens the operation time. If, for example, dolly No. 6 whose current location is unknown is necessary, the operator A searches places outside the coverage of all antennas.

Upon detecting that the user has pressed a dolly change button 1202, the CPU 301 changes the designated dolly in accordance with information input from the operation unit 304. For example, another dolly located nearer than the dolly designated first may exist in the displayed dolly list. In this case, the operation time can be shortened by designating the other dolly.

In step S815, the CPU 301 determines whether the designated dolly is allocated at the discharging port. If the designated dolly is allocated, the process returns to step S808. If the designated dolly is not allocated at the discharging port, the process advances to step S816, and the CPU 301 determines whether to change the dolly. As described above, upon detecting that the user has pressed the dolly change button 1202, the CPU 301 determines to change the dolly. To change the dolly, the process returns to step S807. If the dolly should not be changed, the process returns to step S815.

According to this embodiment, the operator designates one of a plurality of dollies to stack printing paper sheets. When the dolly designated by the designation unit is not allocated at the discharging port, the CPU 301 outputs alert information to the display device of the operation unit 304. This prevents printing paper sheets for different operators from inconveniently being stacked on a single dolly.

The CPU 301 identifies the current location of each dolly using the RFID antenna 140. When the designated dolly is not allocated at the discharging port, the CPU 301 outputs the identified current location of each dolly to the display device of the operation unit 304. This enables the operator to easily search for the designated dolly and also shortens the search time. The print processing interruption time also shortens.

The detection sensor 503 may be provided as a printing paper sheet detection unit for detecting a printing paper sheet stacked on a dolly. In this case, when the dolly designated by the designation unit is allocated at the discharging port but has stacked printing paper sheets, the CPU 301 can output alert information to the display device. This calls the operator's attention to the possibility of mixed stack.

[Second Embodiment]

In the second embodiment, an example will be described, in which a plurality of printing systems having identical arrangements are connected via a network. The second embodiment has many common parts with the first embodiment, and a description of the common parts will not be repeated.

Figure 13:
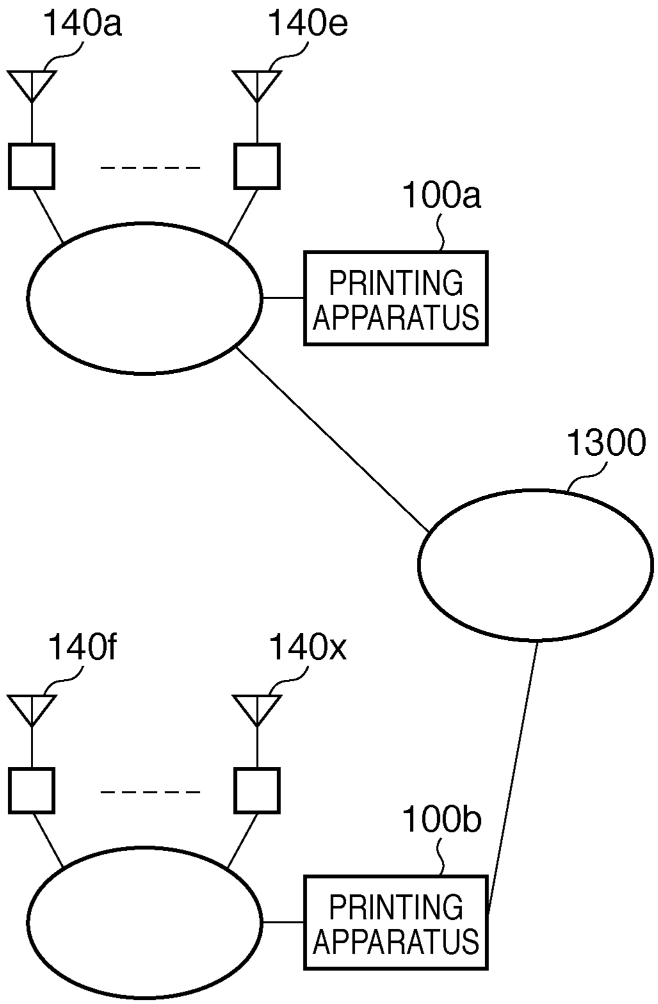
FIG. 13 is a view showing an example of a dolly management system formed by connecting a plurality of printing systems via a network.

FIG. 13 is a view showing an example of a dolly management system formed by connecting a plurality of printing systems via a network. A first printing system includes a printing apparatus 100*a* and RFID antennas 140*a* to 140*e*. A second printing system includes a printing apparatus 100*b* and RFID antennas 140*f* to 140*x*. Each printing system is connected to a TCP/IP network 1300 via an external I/F 306. The plurality of first and second printing systems share all dollies prepared in the print shop.

For example, a first dolly with dolly number No. 1 and a second dolly with dolly number No. 2 are assigned to an operator as dedicated dollies. For example, the first dolly is used to stack printing paper sheets. The second dolly is used to transport printing paper sheets to a post-processing apparatus and execute a post-process while the first dolly is used. Assume that the operator reserves print jobs with the following contents.

First job: stack tray discharge of first printing system (auto select)

Discharging destination: first dolly

Second job: stack tray discharge of second printing system (auto select)

Discharging destination: first dolly

Figure 14A:
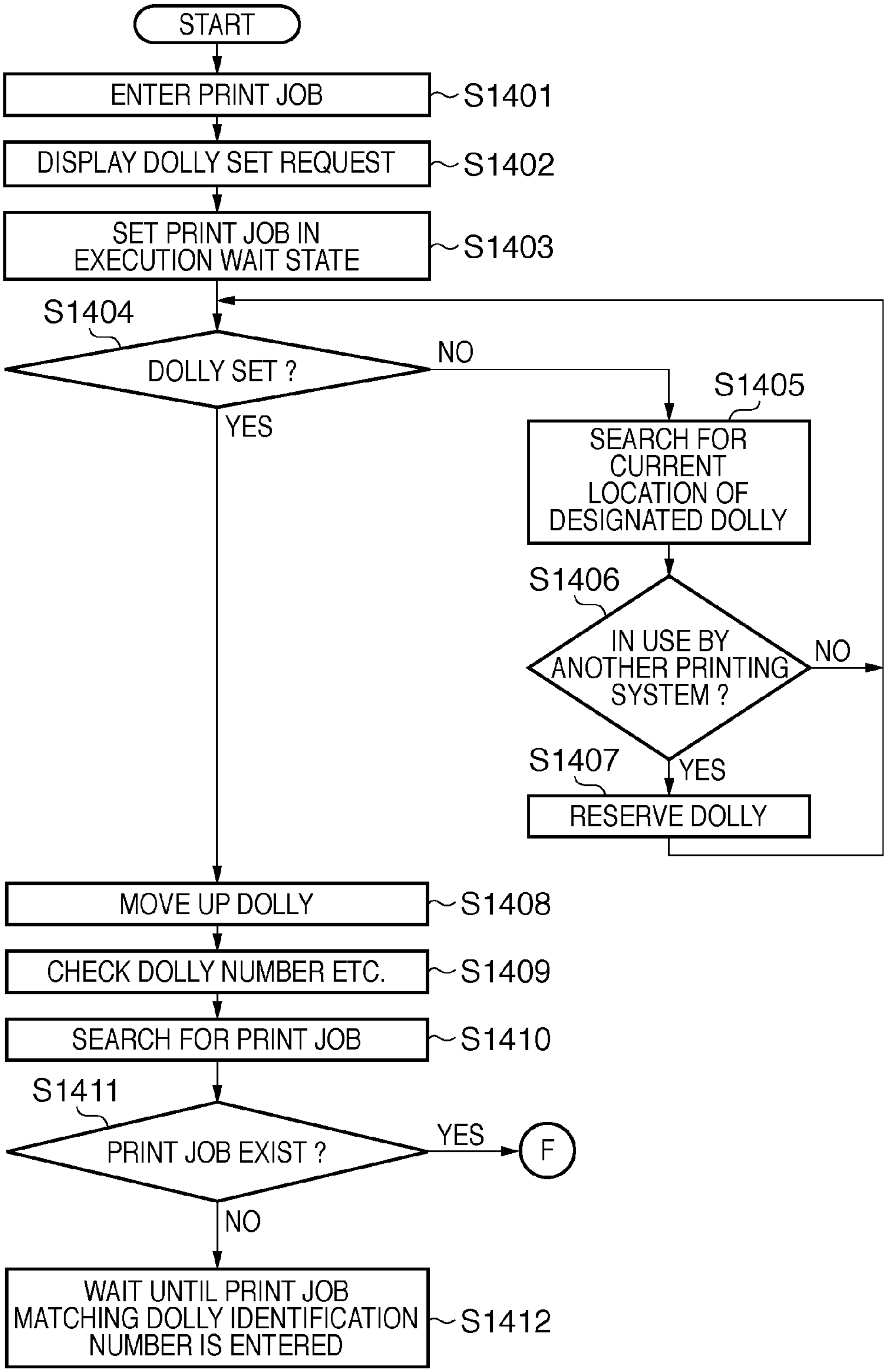
FIGS. 14A and 14B are flowcharts illustrating another example of a dolly management method in executing a print job.
Figure 14B:
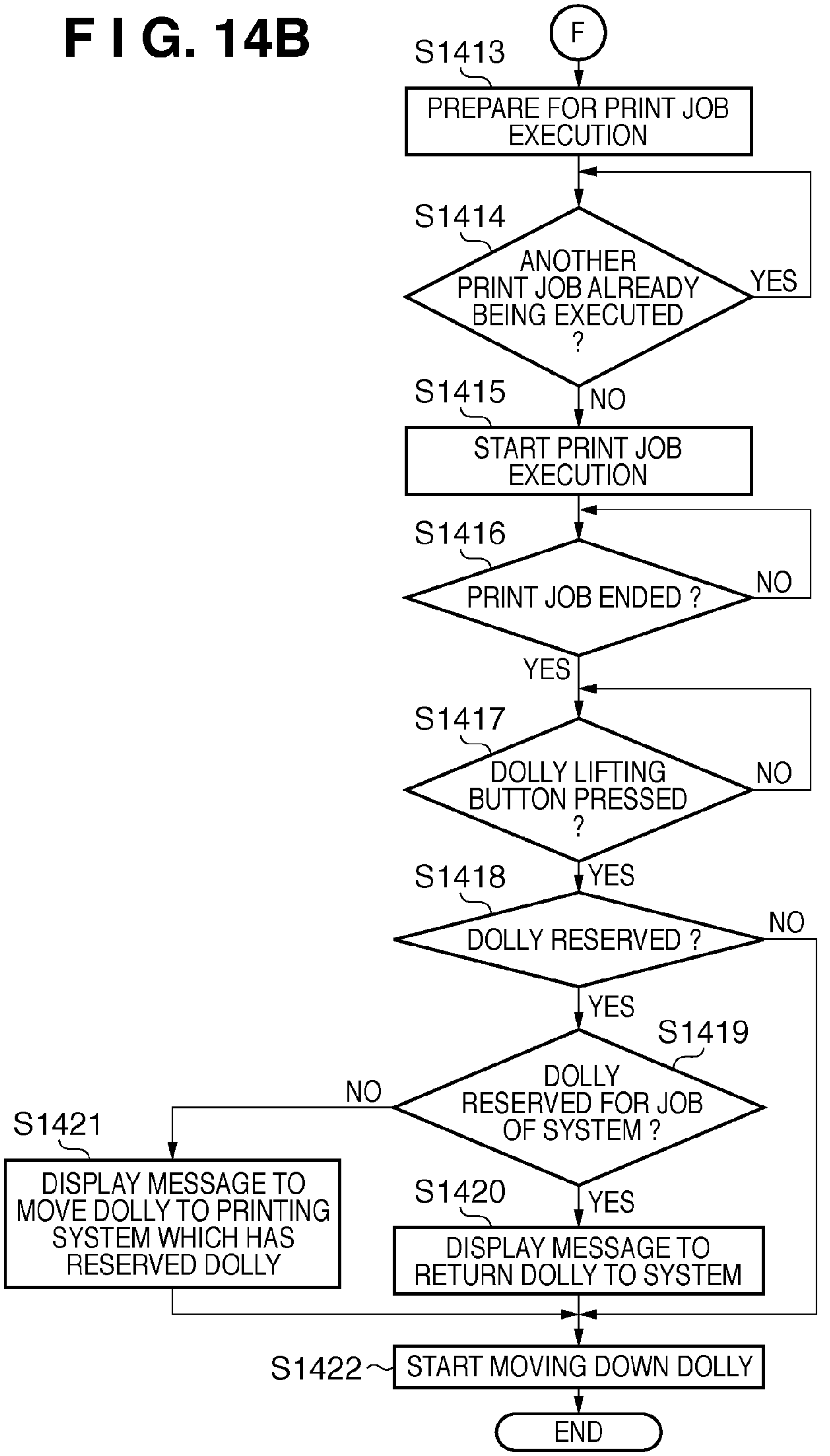

FIGS. 14A and 14B are flowcharts illustrating another example of the dolly management method. The dolly management method is executed by each printing apparatus. A process by the printing apparatus 100*a* of the first printing system will mainly be explained below for descriptive convenience.

In step S1401, a CPU 301 of the printing apparatus 100*a* of the first printing system receives a first job. Upon entering the job, a dolly to be used is designated.

In step S1402, the CPU 301 confirms that the designated dolly (first dolly) is not allocated at the discharging port, and displays, on the display device of an operation unit 304, a message to prompt the user to allocate (set) a dolly at the stack tray discharging port of the stacker.

In step S1403, the CPU 301 sets the entered first job in an execution wait state. For example, the CPU 301 registers the first job (second job) in a job management list for managing jobs to be executed, and also writes a flag representing execution/execution wait.

In step S1404, the CPU 301 determines whether the first dolly without printing paper sheets stacked is allocated at the stack tray of the stacker of the first printing system. The dolly detection process is the same as that described in association with step S805.

If the dolly is not allocated, the process advances to step S1405, and the CPU 301 searches for the current location of the designated dolly (first dolly). The search process is the same as that described in association with steps S812 and S813. The CPU 301 may request another printing system to transmit a current location management table created by that printing system. This allows the user to identify dollies managed by another printing system. In this case, the CPU 301 may merge the current location management table of its own with that received from another printing system. At this time, the CPU 301 may edit the current location information such as an antenna name to clarify a printing system which manages the current location of each dolly.

In step S1406, the CPU 301 determines whether another printing system is using the designated dolly. That is, the CPU 301 functions as a determination unit for determining based on the current location of the dolly designated by the designation unit whether another printing system is using the dolly. For example, if the identification number of the first dolly is not registered in the current location management table of the first printing system but in that acquired from another printing system, the CPU 301 can determine that another printing system is using the desired dolly. If another printing system is not using the dolly, the process returns to step S1404. If another printing system is using the dolly, the process advances to step S1407.

In step S1407, the CPU 301 reserves the first dolly that is being used by another printing system such that the dolly can be used after the end of the print job in the other printing system. More specifically, the CPU 301 transmits a reservation request including the identification number of the reservation target dolly to the other printing system. The CPU of the other printing system writes information representing that the reservation target dolly is reserved by a specific printing system in the current location management table based on the received reservation request. Not the current location management table but a dedicated reservation management table may be created to manage the dolly reservation state. Alternatively, the dolly reservation state may be managed by writing, in the job management table, the dolly number of the dolly together with the job for which the dolly is reserved.

If the desired dolly is set at the discharging port, the process advances to step S1408. In step S1408, the CPU 301 transmits an instruction to a lifting device 270 to move the dolly upward. In step S1409, the CPU 301 reads out the user number, dolly number, and status information of the dolly via the RFID antenna provided in the stacker. All pieces of information are not necessarily read out at once. For example, the CPU 301 of the first printing system may first confirm that the user number read out from the dolly matches the user number assigned to the first job and then read out the dolly number and status information from the dolly. The CPU 301 also determines whether the readout dolly number matches the identification number of the designated first dolly.

In step S1410, the CPU 301 searches the job management list for a job for which the first dolly is designated as the discharging destination and extracts the job. In step S1411, the CPU 301 determines whether a job for which the first dolly is designated as the discharging destination exists. If no such job exists, the process advances to step S1412, and the CPU 401 waits until a job for which the first dolly is designated as the discharging destination is entered.

If a job (first job) for which the first dolly is designated as the discharging destination exists, the process advances to step S1413, and the CPU 301 starts preparing for execution of the job. For example, the CPU 301 starts adjusting the temperature of the fixing unit 202 or drives a flapper for switching the conveyance path.

In step S1414, the CPU 301 determines whether another print job is already being executed. If another print job is being executed, the process waits until the completion of the print job, and the process advances to step S1415. In step S1415, the first job is executed in accordance with the job execution order managed by the job management list.

In step S1416, the CPU 301 determines whether the print job is completed. The process waits until the completion of the print job, and the process advances to step S1417. In step S1417, the CPU 301 determines whether a dolly lifting button provided on the operation unit 304 is pressed. If the dolly lifting button is pressed, the process advances to step S1418 to determine based on the dolly management list or job management list whether the dolly currently allocated at the discharging port is reserved. If the dolly is not reserved, the process advances to step S1422, and the CPU 301 instructs the lifting device 270 to move down the dolly.

If the dolly is reserved, the process advances to step S1419, and the CPU 301 determines whether the dolly allocated at the discharging port is reserved for a job of the system of its own. If the dolly is reserved for a job of the system of its own, the process advances to step S1420, and the CPU 301 displays, on the display device of the operation unit 304, a message to prompt the user to return the dolly to the system after use. The CPU 301 and the CPUs of other systems share dolly reservation information (dolly management list or job management list) by transmitting/receiving it.

If the dolly is reserved for a job entered in another printing system, the process advances to step S1421, and the CPU 301 displays, on the display device of the operation unit 304, a message to prompt the user to move the dolly to the printing system which has reserved the dolly.

The operator pulls out the first dolly having stacked printing paper sheets for the first job from the stacker of the first printing system and then transports the first dolly to the post-processing apparatus. The operator executes post-processes for the stacked printing paper sheets using the post-processing apparatus. The operator moves the printing paper sheets which have undergone the post-processes from the post-processing apparatus to the first dolly again and transports the dolly to the product storage site. Then, the operator moves the first dolly to the dolly return destination referred in step S1421 and allocates the dolly in the stacker of the second printing system.

The operation in the second printing system will briefly be described herein. The second printing system executes the process in accordance with the same program as that of the first printing system, and a description will be made with reference to part of the flowcharts in FIGS. 14A and 14B. While the first printing system is executing the first job, the second printing system continuously displays, on the operation unit, a message to prompt the user to set the first dolly (S1402 to S1404). When the user sets the first dolly in the stack tray of the stacker of the second printing system, the second printing system moves up the dolly (S1408) and reads out the user number, dolly number, and status information of the dolly (S1409).

From then on, almost the same process as the process of the first job in the first printing system is executed. However, during execution of the second job, the second printing system receives no reservation for the next print job that should use the first dolly (NO in S1418). Hence, no reserved job exists at the time of completion of the second job and input of a move-down instruction for the first dolly (YES in S1417). For this reason, step S1421 executed in the first printing system is skipped.

Figure 15:
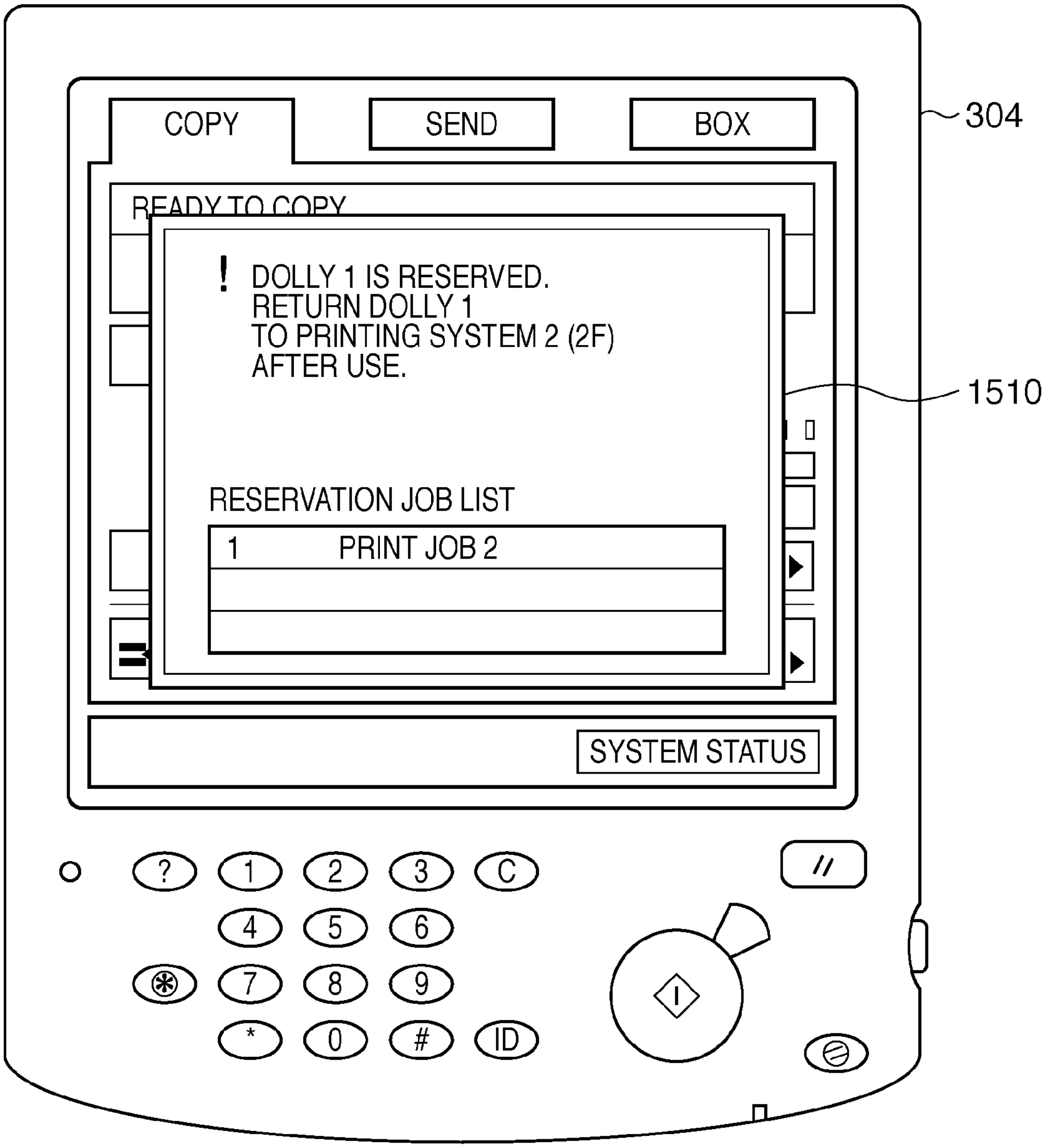
FIG. 15 is a view showing an example of a dialogue displayed when a dolly is reserved by another printing system.

FIG. 15 is a view showing an example of a dialogue displayed when a dolly is reserved by another printing system. A dialogue 1510 includes a message representing the dolly is reserved by another printing system, and a message to prompt the user to move the dolly to the other printing system. The dialogue 1510 may include a list of jobs for which the dolly is reserved.

According to this embodiment, the CPU 301 functions as a determination unit for determining whether the dolly allocated at the discharging port is reserved for use by another printing system. When the dolly allocated at the discharging port is reserved for use by another printing system, the CPU 301 output, to the display device, a message to prompt the user to move the dolly to the other printing system. This notifies the operator of the place to which the dolly should be returned. This also improves the operation efficiency of other operators who use the same dolly.

[Third Embodiment]

In this embodiment, a dolly 150 has a connector for communicating with a stacker in place of an RFID tag. No RFID antenna is installed in the print shop. A printing apparatus 100 (more specifically, stacker 110) has a connector corresponding to the connector of the dolly 150 and communicates with the dolly 150 by cable connection.

When a dolly is allocated in the stack tray of the stacker, the communication connector provided on the dolly is connected to the communication connector provided on the stacker. A CPU 401 of the stacker reads out a user number, dolly number, and status information from the dolly connected via the connector.

Figure 16A:
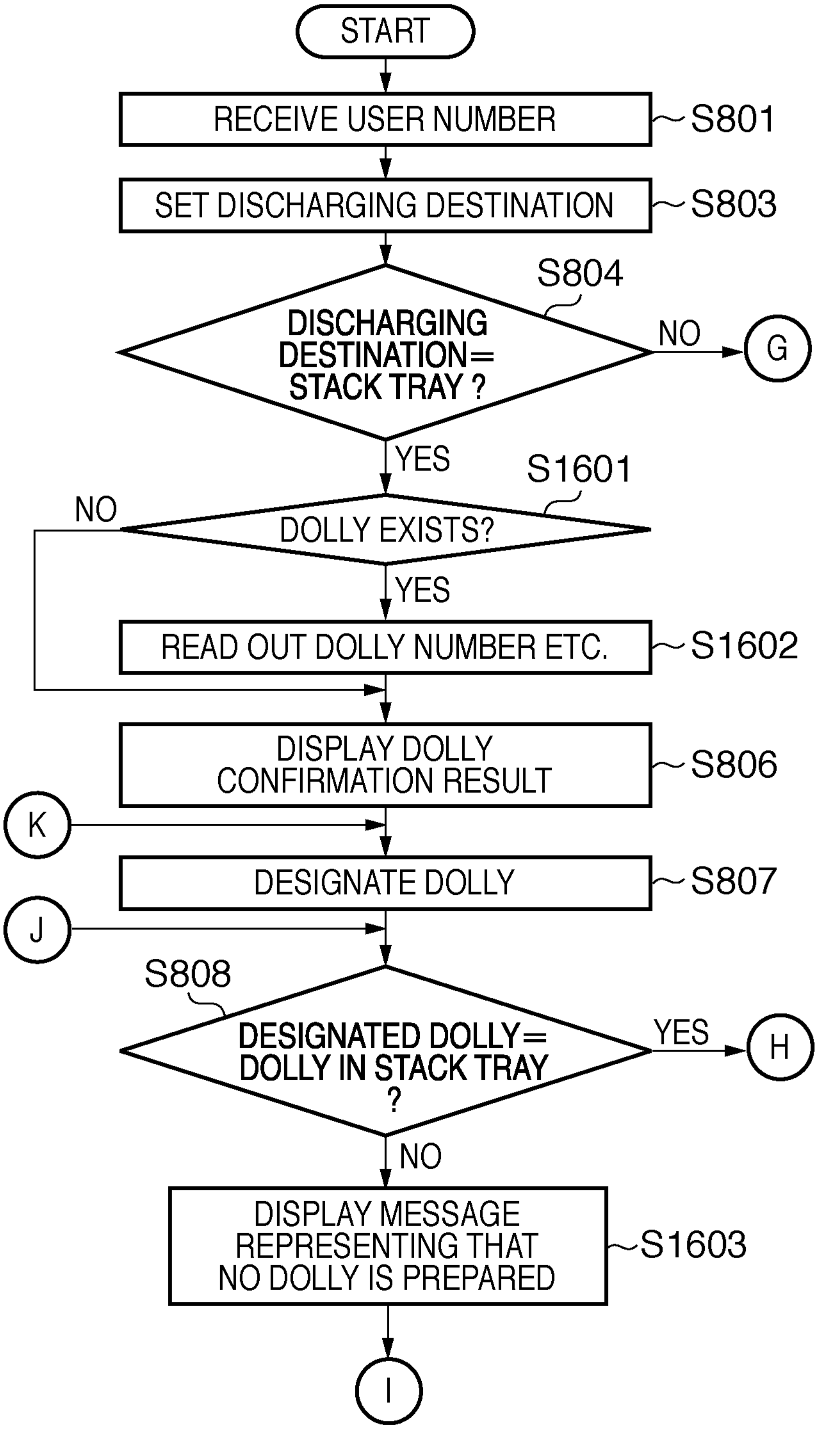
FIGS. 16A and 16B are flowcharts illustrating another example of the dolly management method.
Figure 16B:
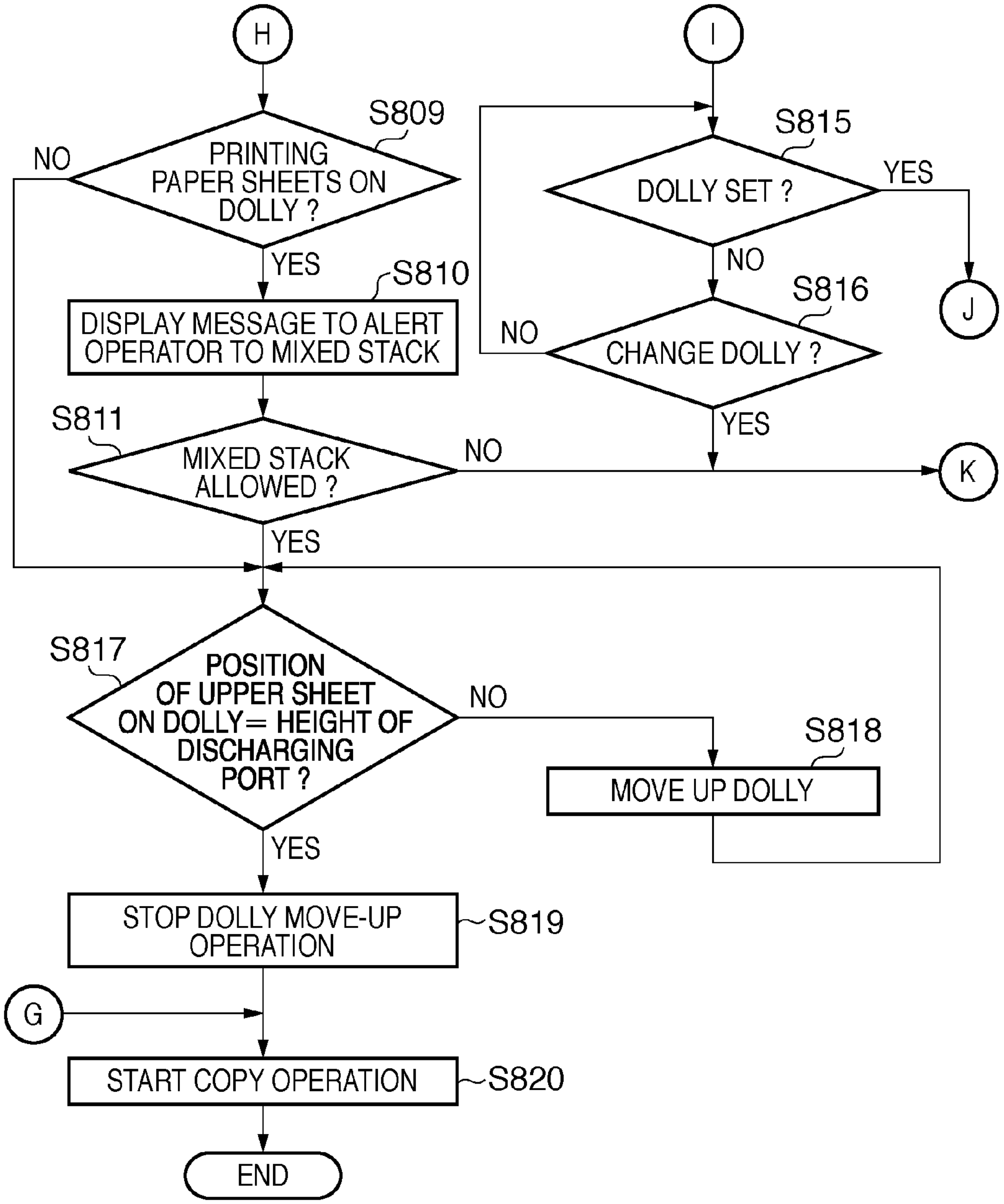

FIGS. 16A and 16B are flowcharts illustrating another example of the dolly management method. The same step numbers as in FIGS. 8A and 8B denote the same processes in FIGS. 16A and 16B. Steps S1601 and S1602 in FIGS. 16A and 16B replace step S805 in FIGS. 8A and 8B. Additionally, step S1603 replaces steps S812 to S814.

In step S1601, a CPU 301 determines whether the dolly 150 exists at the designated stack tray discharging port. For example, if communication with the dolly via the connector is possible, the CPU 301 determines that the dolly is allocated at the discharging port. If the dolly 150 does not exist at the discharging port, the process advances to step S806, and the CPU 301 outputs a message representing the nonexistence of the dolly 150 to the display device. If the dolly 150 exists, the process advances to step S1602, and the CPU 301 reads out the user number, dolly number, and status information from the dolly. More specifically, the CPU 301 instructs the CPU 401 of the stacker to read out the information from the dolly. The CPU 401 transfers the information read out via the connector to the CPU 301 of the printing apparatus. The process advances to step S806, and the CPU 301 displays the information read out from the dolly on the display device of an operation unit 304.

The operator can confirm the displayed user number or dolly number, or the message representing the nonexistence of the dolly and designate a desired dolly to stack printing paper sheets (S807). If the designated dolly is not allocated at the discharging port (S808), the process advances to step S1603, and the CPU 301 displays, on the display device of the operation unit 304, a message representing that the dolly is not prepared.

Figure 17:
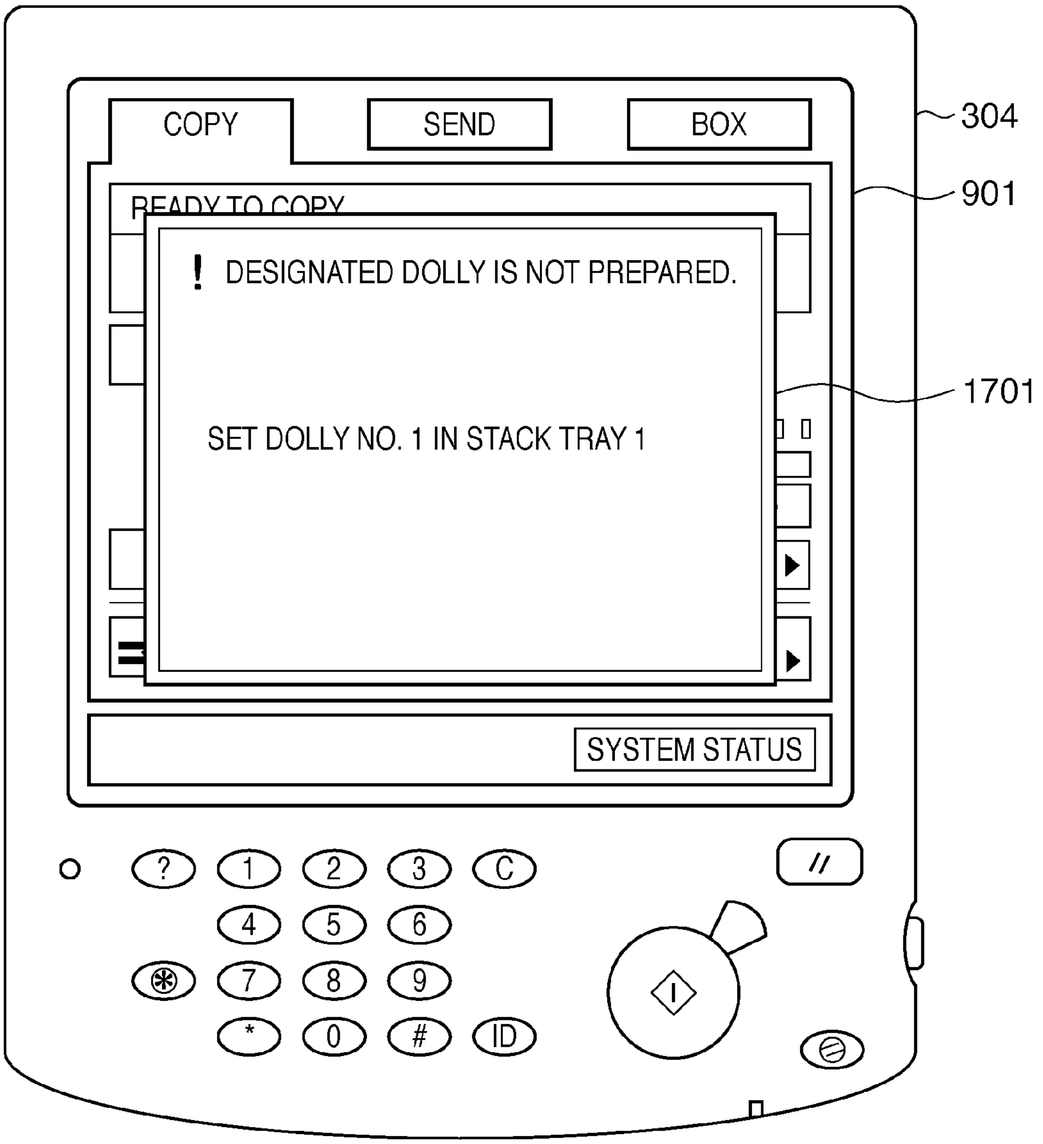
FIG. 17 is a view showing an example of a message representing that the dolly is not prepared.

FIG. 17 is a view showing an example of a message representing that the dolly is not prepared. A dialogue 1701 includes, for example, a message representing that the designated dolly is not prepared, and information such as the dolly number of the dolly to be prepared and the discharging port where the dolly should be allocated. This allows the operator to clearly understand the dolly to be prepared and its allocation place.

According to this embodiment, the present invention is also applicable to a printing system which employs a wired communication unit in place of a wireless communication unit such as RFID, as can be seen.

[Fourth Embodiment]

In this embodiment, a prohibition unit for prohibiting a designation unit from designating a dolly that is being used or reserved by another printing system will be described. In this embodiment, an example will be described, in which an output unit outputs alert information when the designation unit is going to designate a dolly that is being used or reserved by another printing system.

Figure 18:
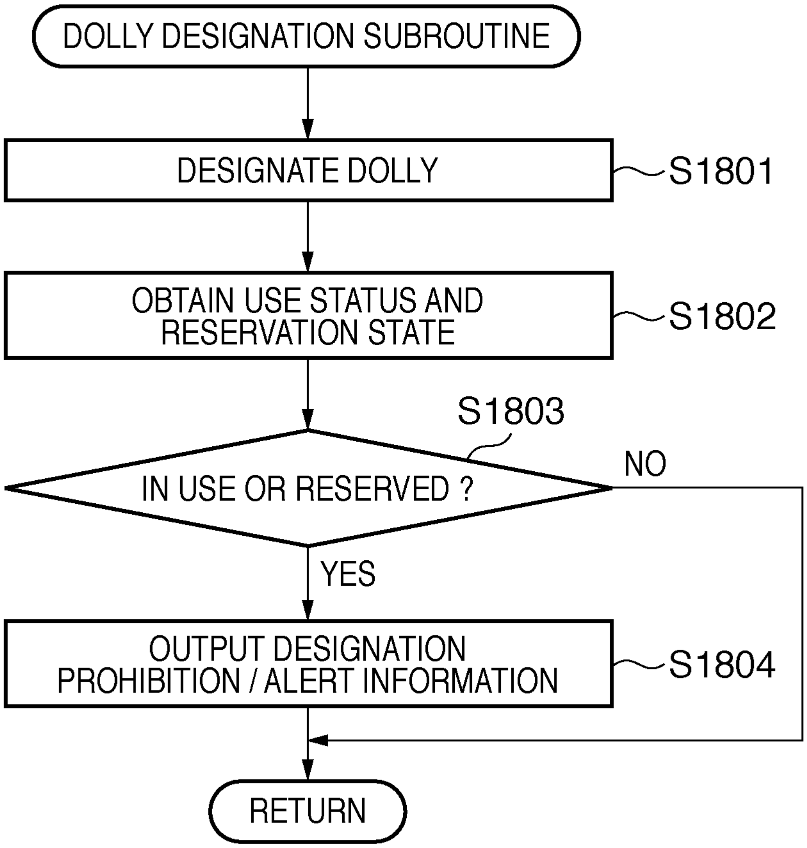
FIG. 18 is a flowchart illustrating still another example of the dolly management method.

FIG. 18 is a flowchart illustrating still another example of the dolly management method. This flowchart shows the dolly designation process in step S807 or S1401 as a subroutine.

As described in the second embodiment, each printing apparatus can transmit/receive, via a TCP/IP network, information about the use status of each dolly (e.g., dolly number and status information) and information about a job reservation state (e.g., job management table).

In step S1801, the CPU 301 designates one of a plurality of dollies to stack printing paper sheets in accordance with information input from an operation unit 304. In step S1802, the CPU 301 obtains the use status and reservation state of the designated dolly from the printing system of its own and another printing system via the TCP/IP network. For example, the CPU 301 can read out the use status in the printing system of its own from each dolly via an RFID antenna 140. The CPU 301 can read out the reservation state in the printing system of its own from, for example, a job management table stored in a RAM 303. The CPU 301 receives the use status and reservation state in another printing system by, for example, inquiring of the other printing system about them via the TCP/IP network. In inquiry, if the CPU 301 transfers the dolly number of the designated dolly, too, the amount of information returned from the other printing system can be reduced. This is because the information of dollies except the designated dolly need not be transferred. This is because only the information of the designated dolly needs to be transferred.

In step S1803, the CPU 301 determines whether the designated dolly is being used or reserved by the printing system of its own or another printing system. If the dolly is being neither used nor reserved, the process returns to the main routine. If the dolly is being used or reserved, the process advances to step S1804.

In step S1804, the CPU 301 outputs alert information to the display device of the operation unit 304. The CPU 301 may output, to the display device, information representing that designation of the dolly is prohibited. That is, the CPU 301 functions as a prohibition unit. In this case, the process returns to step S1801, and the CPU 301 may designate another dolly in accordance with an instruction input from the operation unit 304.

Figure 19:
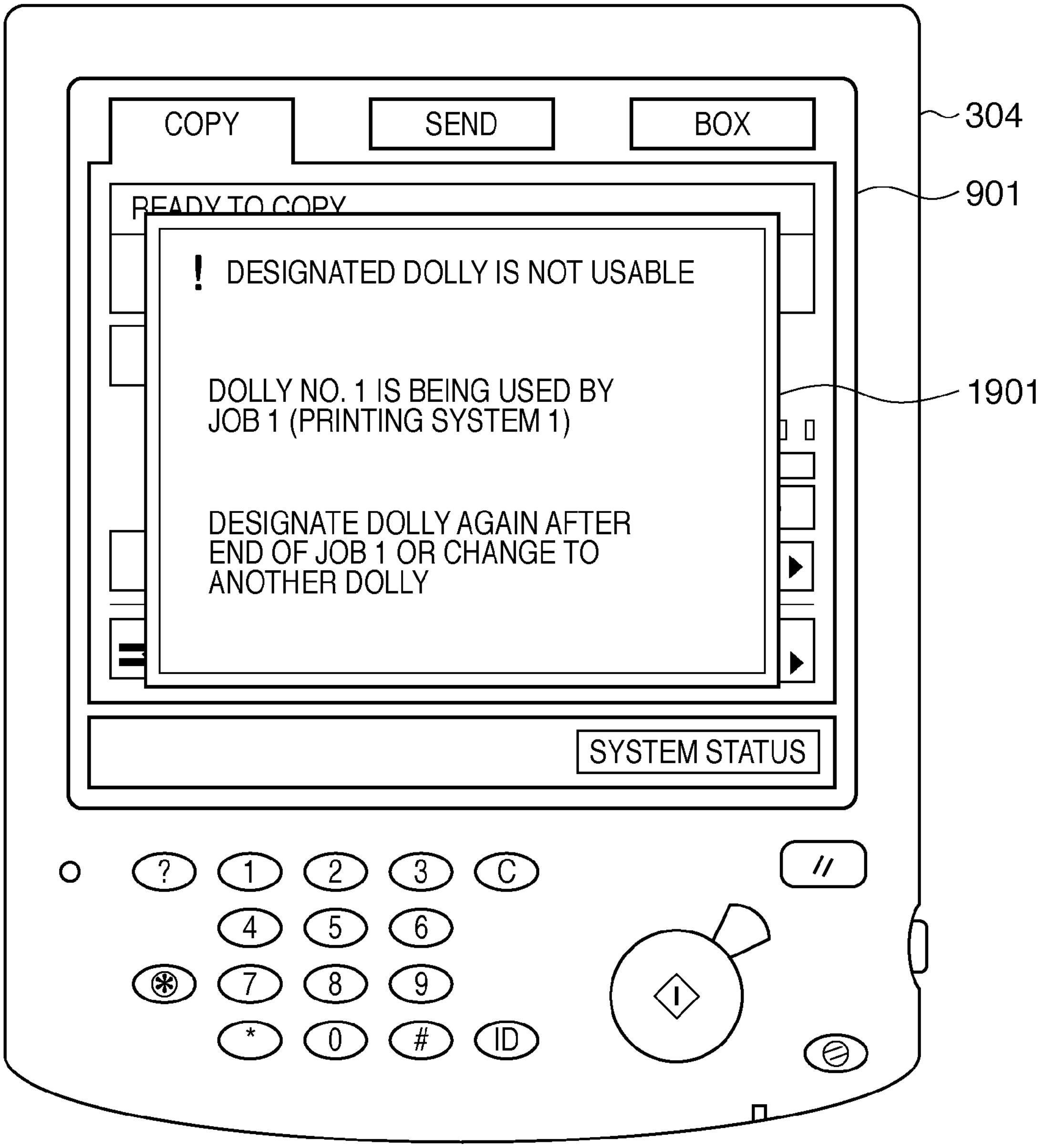
FIG. 19 is a view showing an example of alert information.

FIG. 19 is a view showing an example of alert information. A dialogue 1901 includes a message representing that the designated dolly cannot be used, the dolly number of the dolly, the information of the printing system which is using the dolly, and a guidance for re-designation or designation change.

According to this embodiment, the number of print jobs to be discharged to one dolly can be limited to one. This prevents printing paper sheets of a plurality of print jobs from being stacked on a single dolly even when an operator reserves a number of print jobs.

In this embodiment, entering a plurality of print jobs in one dolly is prohibited. Instead of prohibition, the CPU 301 may output an alert to the operation unit 304 in entering a job. When alert notification is done in place of prohibition, an operator can execute an operation of intentionally outputting a plurality of print jobs to a single dolly.

A limitation is placed on designating a dolly designated as the discharging destination of a preceding print job as the discharging destination of a succeeding print job. This prevents printing paper sheets for different print jobs from being stacked on a single dolly by mixed stack as much as possible.

[Fifth Embodiment]

The invention described in Japanese Patent Laid-Open No. 2005-104707 provides an effective technique for a large-scale printing apparatus such as a rotary duplicator. However, if dollies on standby in the waiting place have run out during parallel processing of a plurality of print jobs, it may be unable to start or continue a print job.

Additionally, if an enormous number of printing paper sheets are output in a print job, the printing apparatus may be left to stand in a stopped state while keeping the enormous number of printing paper sheets stacked on a dolly. The operator must quickly find another dolly as soon as he/she has noticed this situation. Time is wasted until a dolly is prepared.

For a printing apparatus used on the POD (Print On Demand) market that is widespread in recent years, only a minimum necessary number of dollies are prepared near the printing apparatus from the viewpoint of space. This particularly makes the above problems come to the surface.

The fifth embodiment aims at, for example, facilitating preparation of dollies in advance. Further problems will become apparent throughout the specification.

This embodiment is properly implemented by a printing system including a printing apparatus which image-forms on a printing paper sheet, and a plurality of dollies on which the printing paper sheet discharged from the discharging port of the printing apparatus is stacked. The printing apparatus is especially characterized by comprising a location identification unit for identifying the current location of each dolly, and a display unit for displaying the identified current location of each dolly.

Figure 20A:
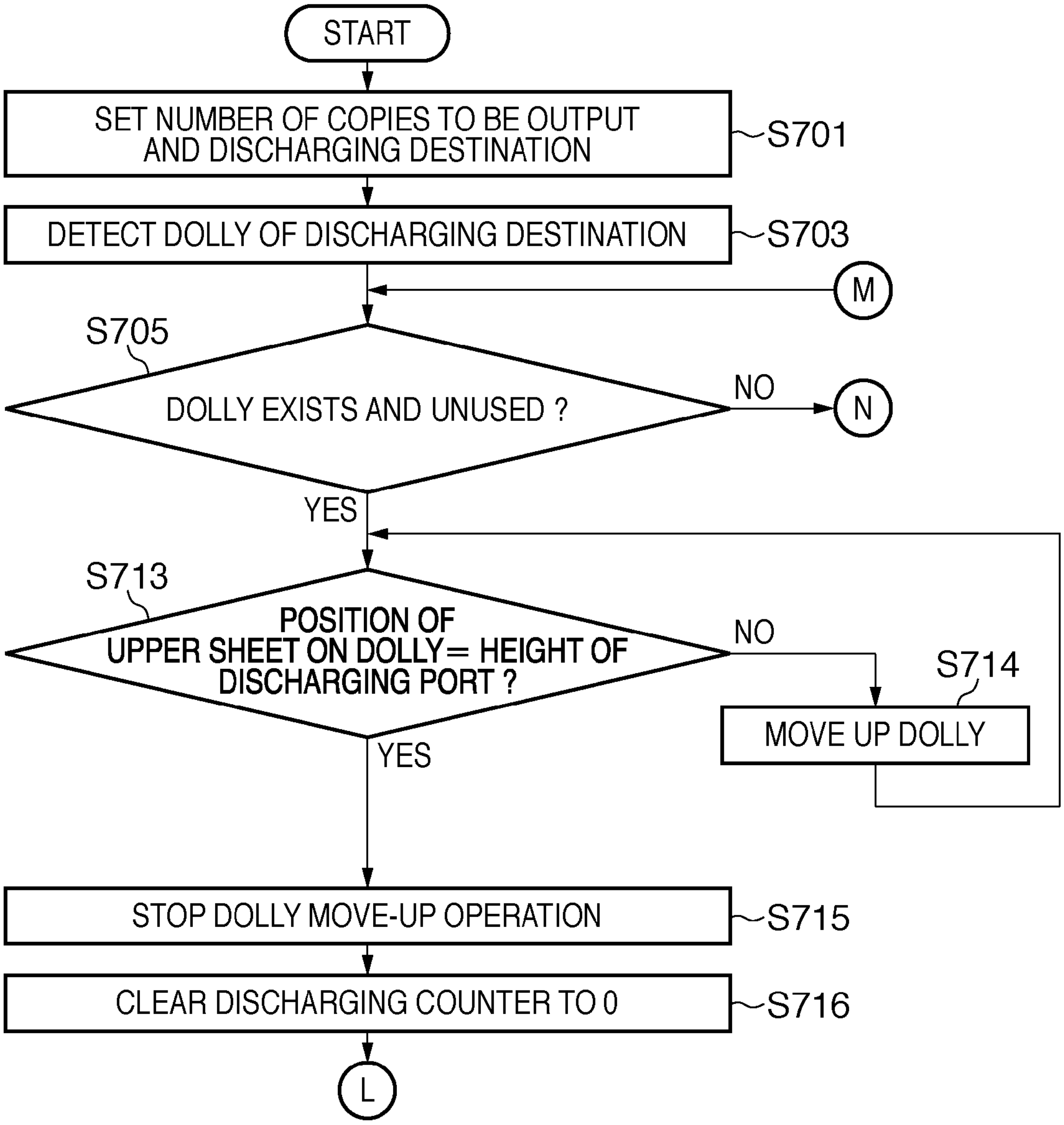
FIGS. 20A and 20B are flowcharts illustrating part of a dolly management method according to an embodiment.
Figure 20B:
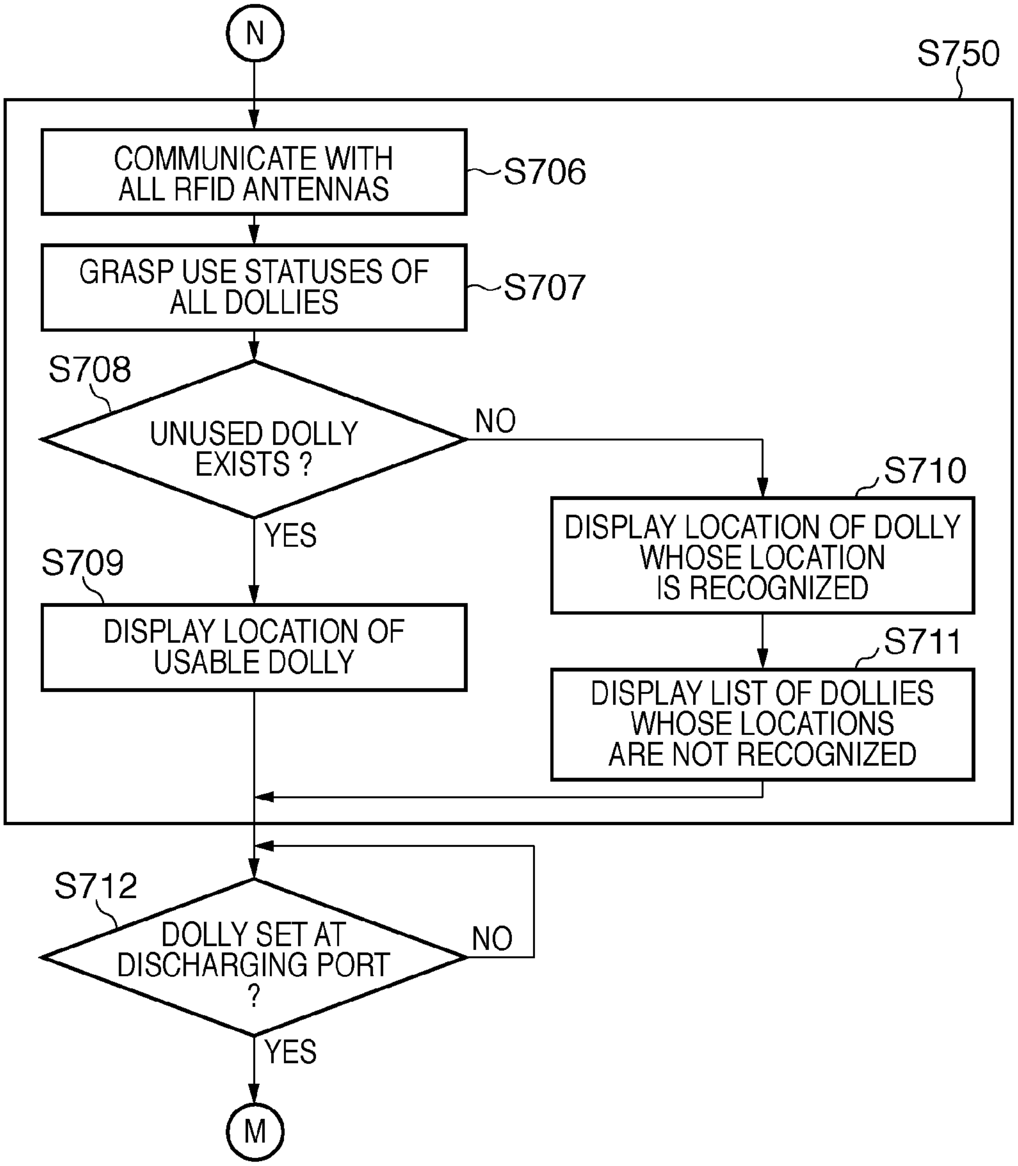

FIGS. 20A and 20B are flowcharts illustrating part of a dolly management method according to this embodiment. This will be explained assuming that the dolly management method is executed in parallel to execution of a copy job.

In step S701, a CPU 301 sets the number of copies to be output and a discharging destination in accordance with setting information input from an operation unit 304. The discharging destination is one of four portions: the stack tray (dolly) and sample tray of a stacker 110*a* and the stack tray and sample tray of a stacker 110*b*. The CPU 301 notifies a CPU 401 of the stacker having the discharging destination designated on the operation unit 304 that the stacker is designated as the discharging destination. For the descriptive convenience, assume that a stack tray is designated as the discharging destination.

In step S703, the CPU 301 tries to detect a dolly 150 at the discharging port of the stacker designated as the discharging destination. More specifically, the CPU 301 causes a dolly detection unit 410 formed from an RFID antenna 140 to detect the presence/absence of a dolly. For example, if an RFID antenna 140*a* arranged in the stack tray of the stacker can wirelessly communicate with an RFID tag 504 of a dolly 150*a*, the CPU can know that a dolly exists in the stack tray. If the RFID antenna 140*a* in the stacker starts wireless communication and receives no response, it indicates that no dolly is allocated at the discharging port. If a dolly exists, the CPU 301 can also obtain, from the dolly, identifications (system number and dolly number 602) and status information 603 of the dolly.

In step S705, the CPU 301 determines on the basis of the detection result whether the dolly exists at the designated discharging port. At this time, the CPU 301 can also determine whether the dolly allocated at the discharging port is unused. If the dolly is allocated at the designated discharging port, the process advances to step S706. Even when the dolly exists, and printing paper sheets are already stacked on it, the process advances to step S706. Steps S706 to S711 are represented as step S750. In step S750, the current location of each dolly is identified and displayed.

In step S706, the CPU 301 starts communicating with all RFID antennas 140. In step S707, the CPU 301 obtains identifications and status information from dollies capable of communicating with the RFID antennas 140 and creates a dolly management list. The dolly management list is stored in a RAM 303.

FIG. 21 is a view showing an example of the dolly management list. The identification number (antenna No) of each RFID antenna and place information (antenna name) representing the installation place of the RFID antenna are registered in a dolly management list 800. The CPU 301 obtains a system number, dolly number, and status information by sequentially communicating with each RFID antenna and registers the obtained information in the dolly management list 800.

As is apparent from the dolly management list 800, for example, antenna No. 2 is installed in the sheet storage site. Additionally, antenna No. 2 can communicate with dolly No. 9 of system 1, and the dolly is unused, as can be seen.

FIG. 22 is a view showing another example of the dolly management list. A dolly management list 900 is obtained by sorting the dolly identification numbers in the dolly management list 800 in ascending order. As is apparent from the dolly management list 900, for example, dolly No. 1 is unused and located near the product storage site.

In step S708, the CPU 301 determines by referring to the dolly management list 900 whether a dolly unused at the current time exists. As is apparent from FIG. 22, four dollies Nos. 1, 3, 4, and 9 are unused. If an unused dolly exists, the process advances to step S709, and the CPU 301 reads out, from the dolly management list 900, the current location (antenna name) of each dolly unused at the current time and displays it on the display device of the operation unit 304.

Figure 23:
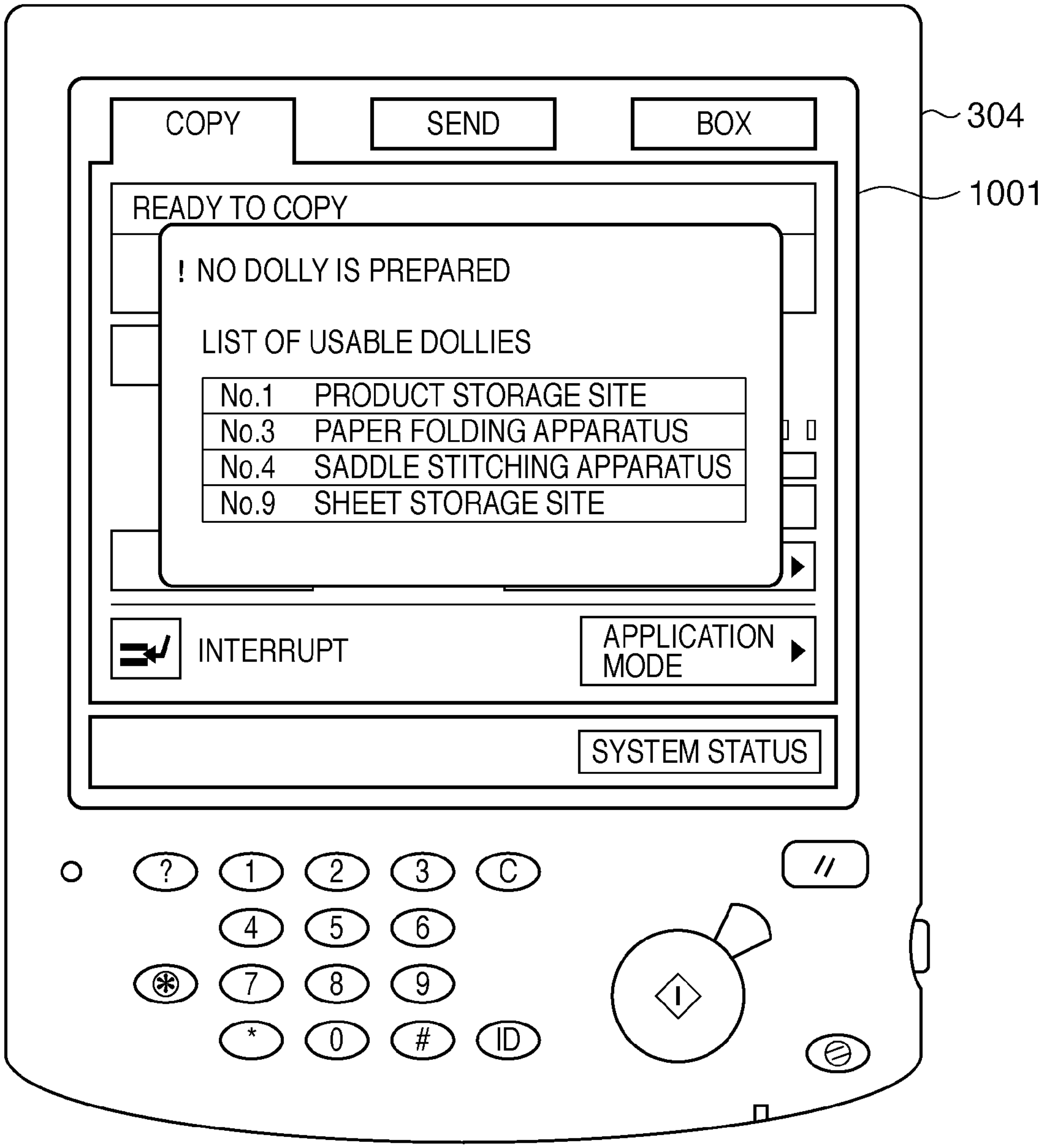
FIG. 23 is a view showing a display example of the current locations of dollies.

FIG. 23 is a view showing a display example of the current locations of dollies. A display device 1001 displays a list of the dolly numbers of usable dollies in a plurality of dollies and pieces of location information representing their current locations. This enables the operator to easily grasp the necessity of preparation of a dolly and the current locations of unused dollies. That is, the CPU 301 functions as a display control unit for displaying the current locations of dollies on the display device 1001 when no dolly is allocated at the discharging port regardless of the designation of printing paper sheet discharge to a dolly allocated at the discharging port.

However, if no dolly is available at the time of copy job setting (NO in S708), the process advances to step S710. In step S710, the CPU 301 reads out, from the dolly management list 900, the current location and status information of each dolly whose current location is recognized and displays the readout information on the display device 1001. In step S711, the CPU 301 may also create a list of dollies for which communication is impossible (the current location is not recognized) and display the list on the display device 1001. Assume that the CPU 301 grasps the identifications of all dollies in advance. In this case, the operator prohibits start of the copy operation or interrupts the operation until an unused dolly is prepared, or enters printing paper sheets stacked on the dolly that is being used into a post-processing apparatus, thereby making the dolly usable, as before. In some instances, the operator searches for a dolly with which communication cannot be done at all.

After the messages about the current location of each dolly are displayed in steps S709 to S711, the process advances to step S712, and the CPU 301 determines whether a usable dolly is set in the stack tray of the stacker. Whether a dolly is set is detected in the same way as described in association with step S703. When a dolly is detected, the CPU 301 erases the messages displayed in steps S709 to S711, and the process returns to step S705.

If the dolly is located at the designated discharging port and unused, the process advances to step S713, and the CPU 301 determines whether a position of the upper sheet (plane to stack printing paper sheets) on the dolly is aligned with a stack tray discharging port 267. The CPU 301 detects the height of the upper plane of the dolly by using, for example, a height detection sensor included in the dolly detection unit 410. If they are not aligned, the process advances to step S714, and the CPU 301 instructs a lifting device 270 to move up the dolly by one step. Then, the process returns to step S713.

When the upper plane of the dolly is aligned with the stack tray discharging port 267, the process advances to step S715, and the CPU 301 instructs the lifting device 270 to stop the move-up operation. Since no printing paper sheets are stacked on the dolly at this time, the CPU 301 clears the value of a discharging counter ensured in the RAM 303 to 0 in step S716. The above-described height detection sensor may be turned on when the upper plane of the dolly has reached the height of the discharging port 267. The position where the upward movement of the dolly stops may be a predetermined position below the discharging port, as described above. The discharging counter is a count unit for counting the number of printing paper sheets stacked on the dolly allocated at the discharging port.

Figure 24A:
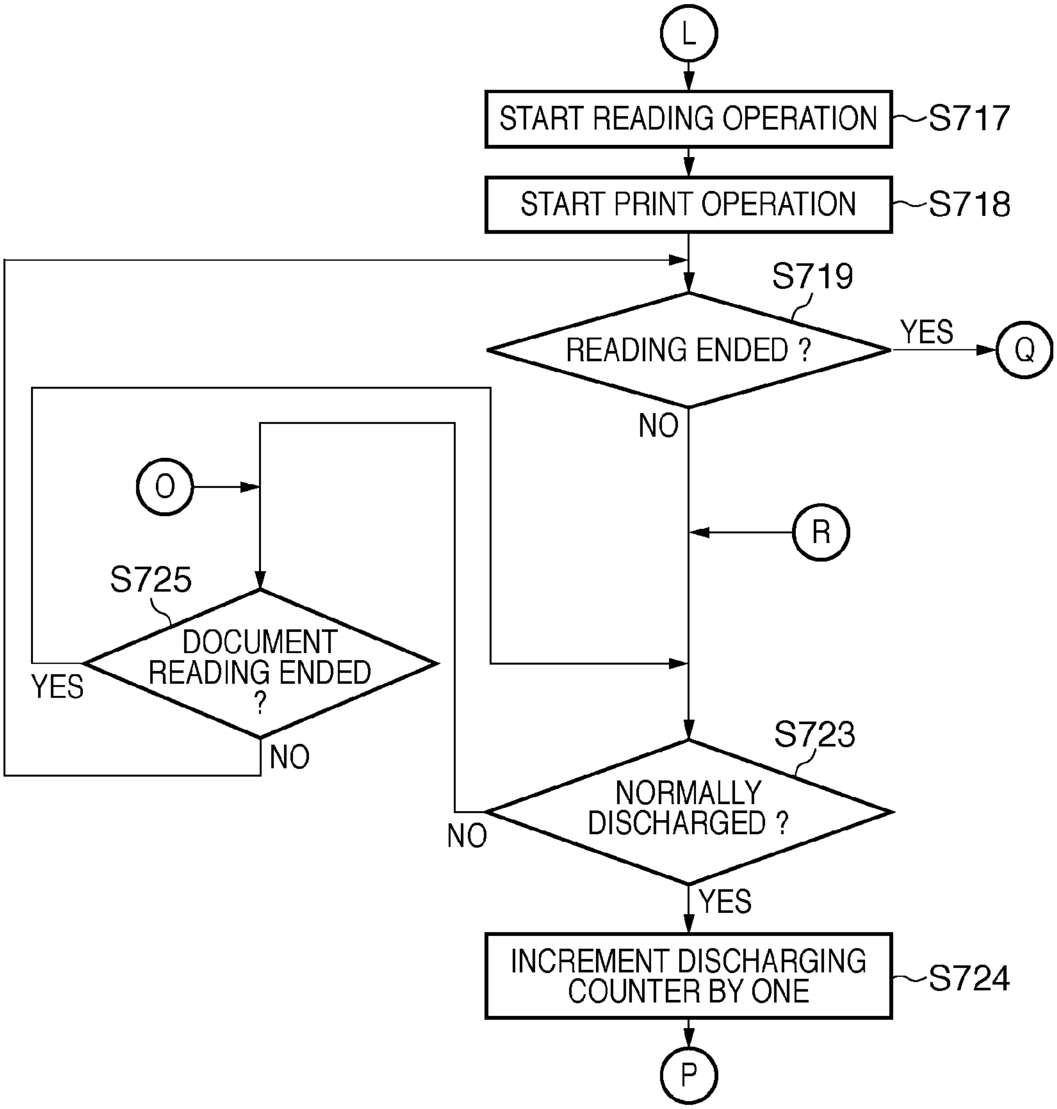
FIGS. 24A and 24B are flowcharts illustrating part of the dolly management method according to the embodiment.
Figure 24B:
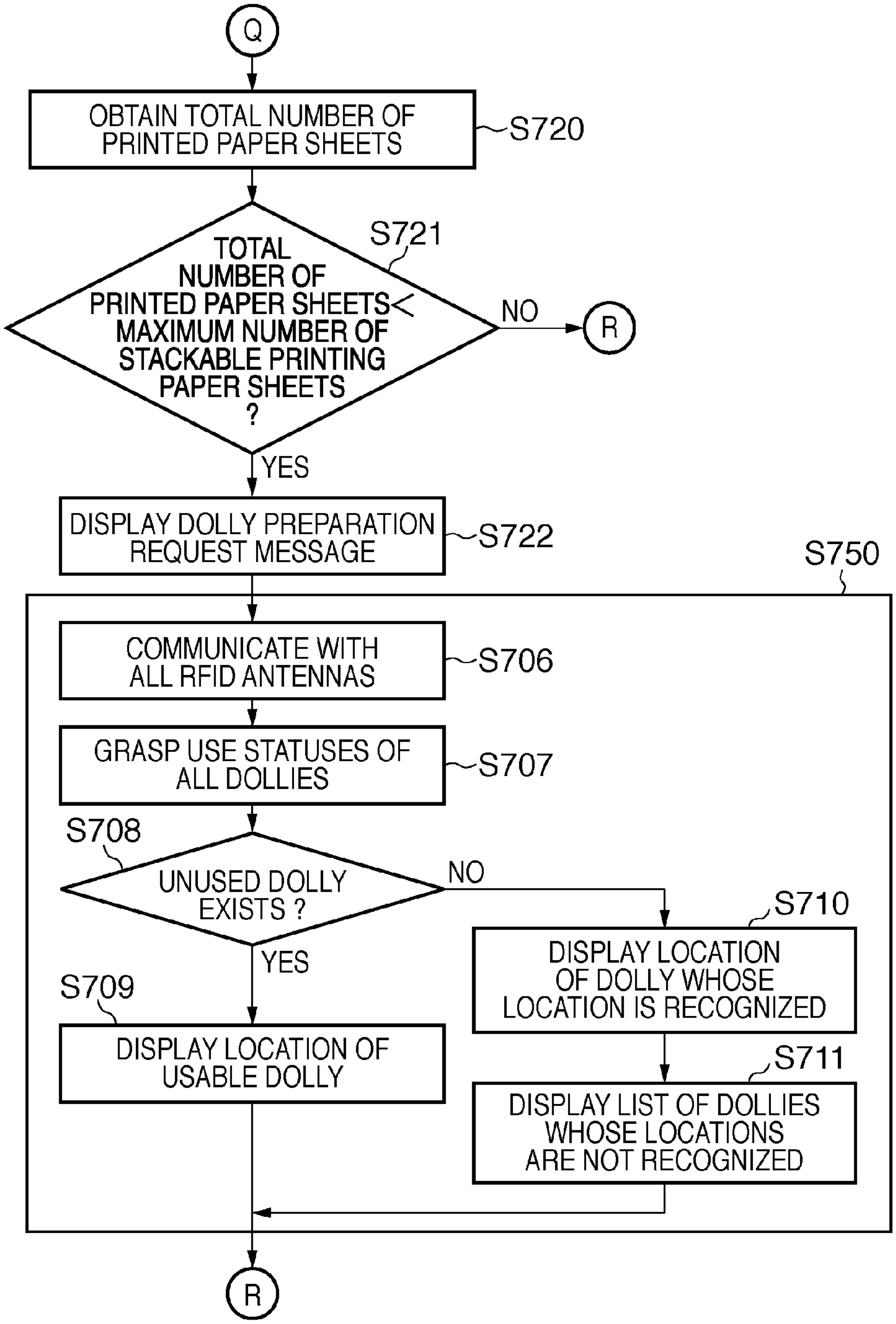

FIGS. 24A and 24B are flowcharts illustrating part of the dolly management method according to the embodiment. More specifically, this flowchart follows that in FIGS. 20A and 20B.

In step S717, the CPU 301 instructs a reader unit 200 to read a document. In step S718, the CPU 301 instructs an image forming unit 201 to start a print operation. The read document image is formed in this way.

In step S719, the CPU 301 determines whether reading of all document pages is ended while executing both the document reading operation and the print operation. If reading is not ended, the process advances to step S723, and the CPU 301 determines whether the printing paper sheets are normally discharged. If discharging is not ended, the process advances to step S725, and the CPU 301 determines whether reading of the document is ended. If reading is not ended, the process returns to step S719. If reading is ended, the process advances to step S723.

According to the flowcharts in FIGS. 24A and 24B, when reading of all document pages is ended, it is confirmed in step S723 only whether the printing paper sheets are normally discharged. If discharging of the printing paper sheets is normally ended, the process advances to step S724, and the CPU 301 increments the value of the discharging counter by one.

If it is determined in step S719 that reading of the document is ended, the process advances to step S720. In step S720, the CPU 301 calculates the total number of printed paper sheets. When reading of the document is ended, the CPU 301 can specify the number of printed paper sheets per copy of the copy job. Hence, the CPU 301 can calculate the total number of printed paper sheets by multiplying the designated number of copies to be output by the number of printed paper sheets per copy. In executing a print job transmitted from a computer, the CPU 301 can calculate the total number of printed paper sheets by analyzing the print job.

In step S721, the CPU 301 determines whether the total number of printed paper sheets exceeds the limit of the number of paper sheets to be stacked on a dolly. More specifically, the CPU 301 determines whether it is possible to stack printing paper sheets on only the dolly that is currently being set. The limit of the number of paper sheets may equal the maximum number of paper sheets stackable on the dolly. The maximum number of paper sheets stackable on the dolly is determined by, for example, the relationship between the thickness of a printing paper sheet to be stacked and the moving-up/down distance of the dolly in the stack tray of the stacker. A ROM 302 stores in advance the thickness of a printing paper sheet of each brand. The maximum number of printing paper sheets stackable on a dolly changes depending on the brand of printing paper sheets to be stacked on the dolly. The brand to be used is input from the operation unit 304 and stored in the RAM 303 in advance. The relationship between brands and paper thicknesses is stored in the ROM 302. A media sensor for discriminating the brand or thickness of a paper sheet may obtain the brand or thickness. The information of the moving-up/down distance of a dolly is also stored in the ROM 302 in advance.

If the total number of printed paper sheets of the copy job is not larger than the maximum number of printing paper sheets stackable on the dolly, the process returns to step S723. If the total number of printed paper sheets of the copy job is larger than the maximum number of printing paper sheets stackable on the dolly, the process advances to step S722, and the CPU 301 displays, on the display device 1001, a message to prompt the user to prepare a dolly. Then, the CPU 301 executes step S750 (above-described steps S706 to S711) and displays the current locations and use statuses of the dollies on the display device 1001.

A detailed example of the total number of printed paper sheets and the maximum number of printing paper sheets stackable on a dolly will be described herein. Assume that the maximum number of printing paper sheets stackable on a dolly set in the stacker is 5,000, and the number of copies to be output by the copy job is 200. Additionally, assume that the number of printed paper sheets per completed copy is 20.

$$5000\text{ sheets} > 200\text{ copies} \times 20\text{ sheets} = 4000\text{ sheets}$$

Hence, in this case, the dolly need not be exchanged (NO in S721). If the number of printed paper sheets per copy is 30, $$5000\text{ sheets} < 200\text{ copies} \times 30\text{ sheets} = 6000\text{ sheets}$$

Hence, it is not possible to stack all printed paper sheets on only the dolly that is currently being used to stack (YES in S721). The CPU 301 displays a message to prompt the operator to prepare for exchange of the dolly.

If printing paper sheets are being stacked on the dolly when the operator is prompted to prepare for the next dolly, the operator sets the prepared next dolly on standby near the stacker of the discharging destination. When a predetermined number of printing paper sheets equal to or smaller than the maximum number of stackable paper sheets (e.g., 30 sheets×166 copies=4980 sheets which is closest to the maximum number of stackable printing paper sheets at a break between copies) are stacked on the dolly that is currently being used to stack, the CPU 301 stops the print operation. At the timing of stopping the print operation, the operator manually replaces the dolly. If the printing apparatus 100 has an automatic replacing mechanism, the dolly is automatically replaced with the next dolly.

However, if an unused stack tray of a stacker exists, the operator can set the stack tray as the subsequent tray. In this case, when a sufficient number of printing paper sheets are stacked on the dolly that is currently being used to stack, the CPU 301 switches the discharging destination to the subsequent tray and continues the print operation.

Figure 25A:
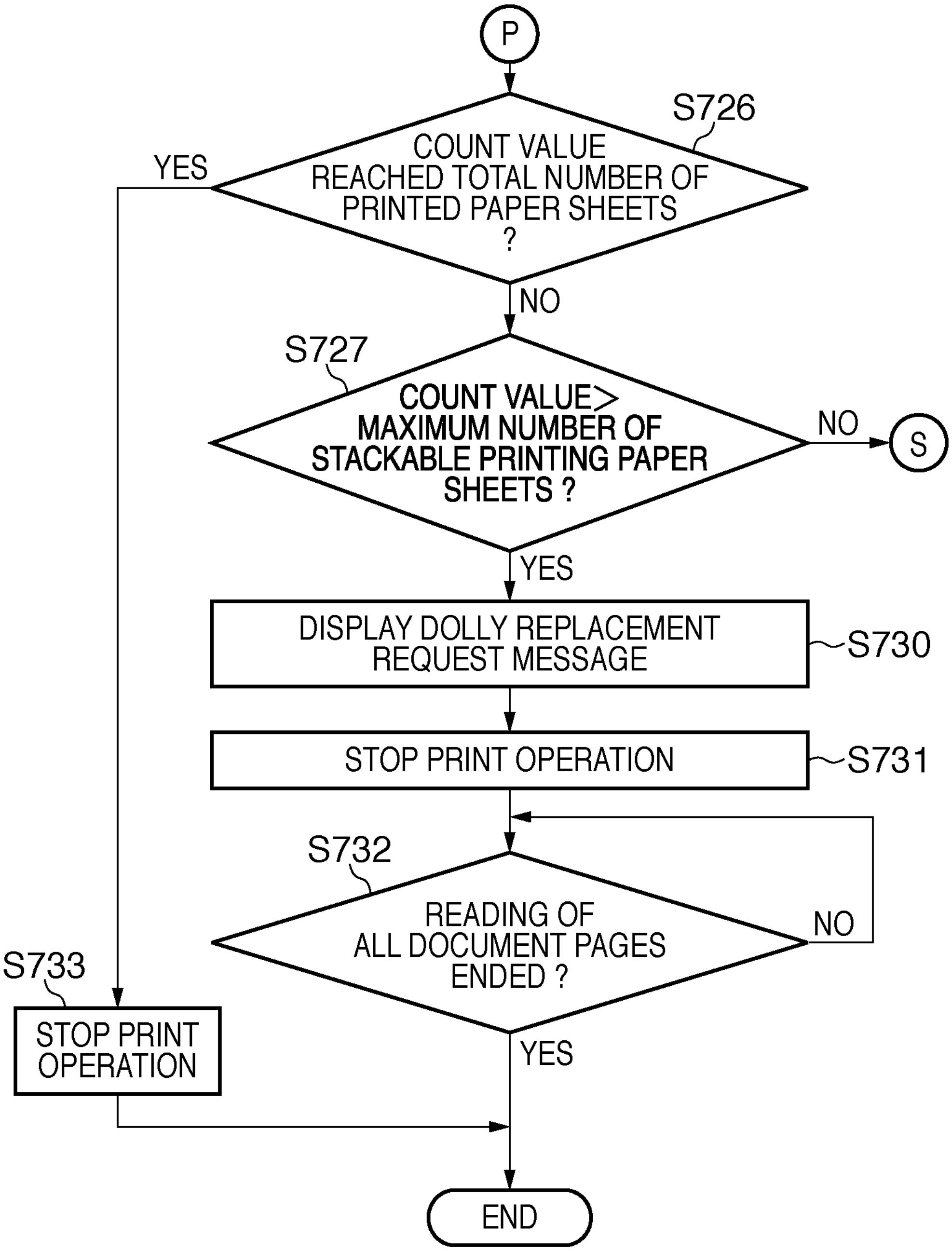
FIGS. 25A and 25B are flowcharts illustrating part of the dolly management method according to the embodiment.
Figure 25B:
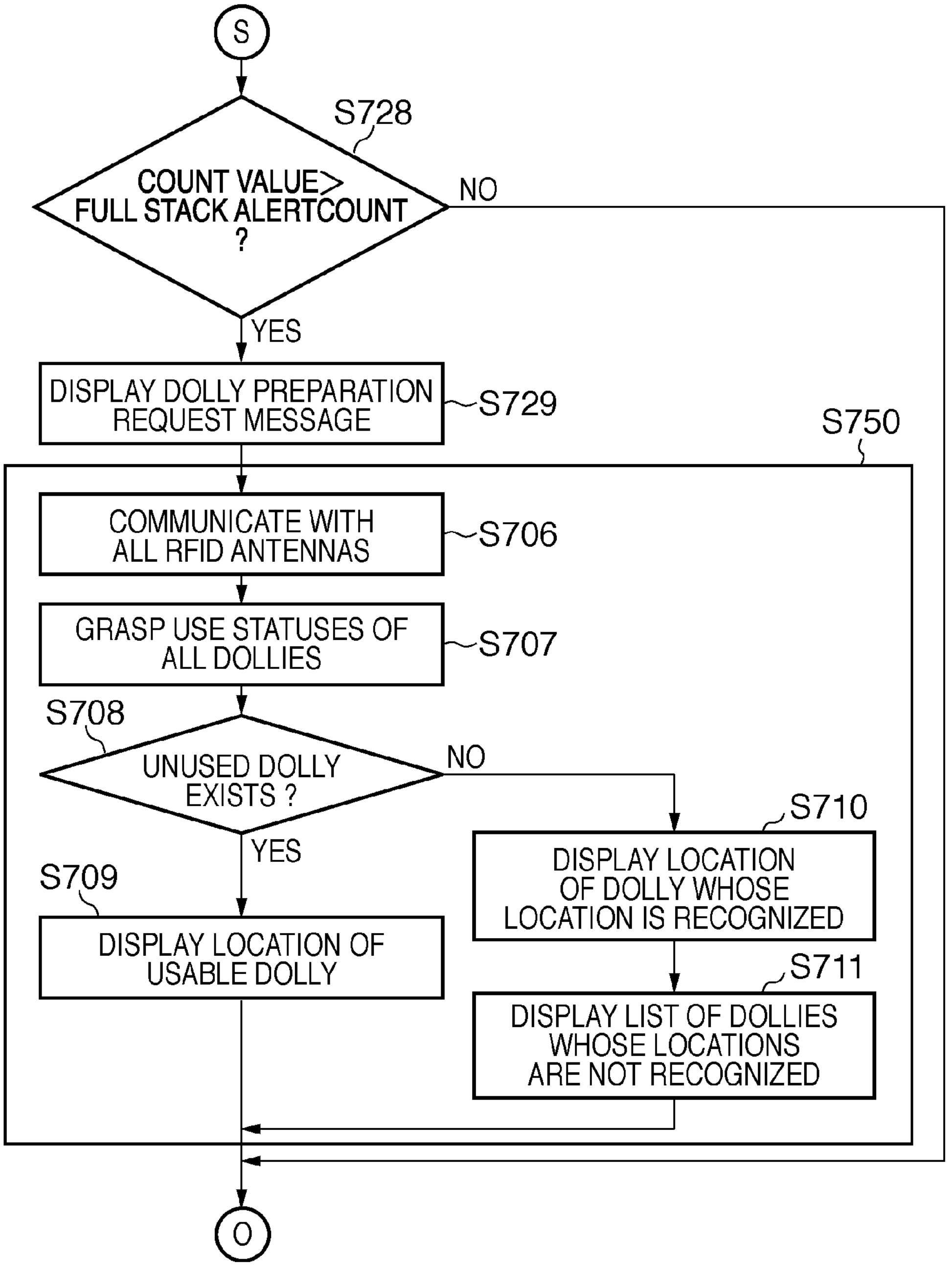

FIGS. 25A and 25B are flowcharts illustrating part of the dolly management method according to this embodiment. More specifically, this flowchart follows that in FIGS. 24A and 24B. In step S726, the CPU 301 determines whether the value of the discharging counter has reached the total number of printed paper sheets. If the counter value has reached the total number of printed paper sheets, the process advances to step S733. In step S733, the CPU 301 stops the print operation because the copy job is ended.

If the value of the discharging counter has not reached the total number of printed paper sheets, the process advances to step S727, and the CPU 301 determines whether the value of the discharging counter is larger than the maximum number of printing paper sheets stackable on the dolly. If the counter value is not larger than the maximum number of stackable printing paper sheets, the process advances to step S728, and the CPU 301 compares the counter value with the full stack alert count of the dolly. The full stack alert count is a threshold number of printing paper sheets which triggers display of the identified current location of each dolly on the display device 1001. That is, when the value of the discharging counter has reached the full stack alert count of the dolly, it indicates that it is still possible to stack printing paper sheets on the dolly but also notifies the operator that the time to replace the dolly will come soon. Hence, if the value of the discharging counter exceeds the full stack alert count of the dolly, the process advances to step S729, and the CPU 301 displays, on the display device 1001, a message to prompt the user to prepare a dolly. Then, the CPU 301 executes above-described step S750 (S706 to S711). The CPU 301 may display, on the display device 1001, the message to prompt the user to prepare a dolly when the value of the discharging counter matches the full stack alert count of the dolly.

Figure 26:
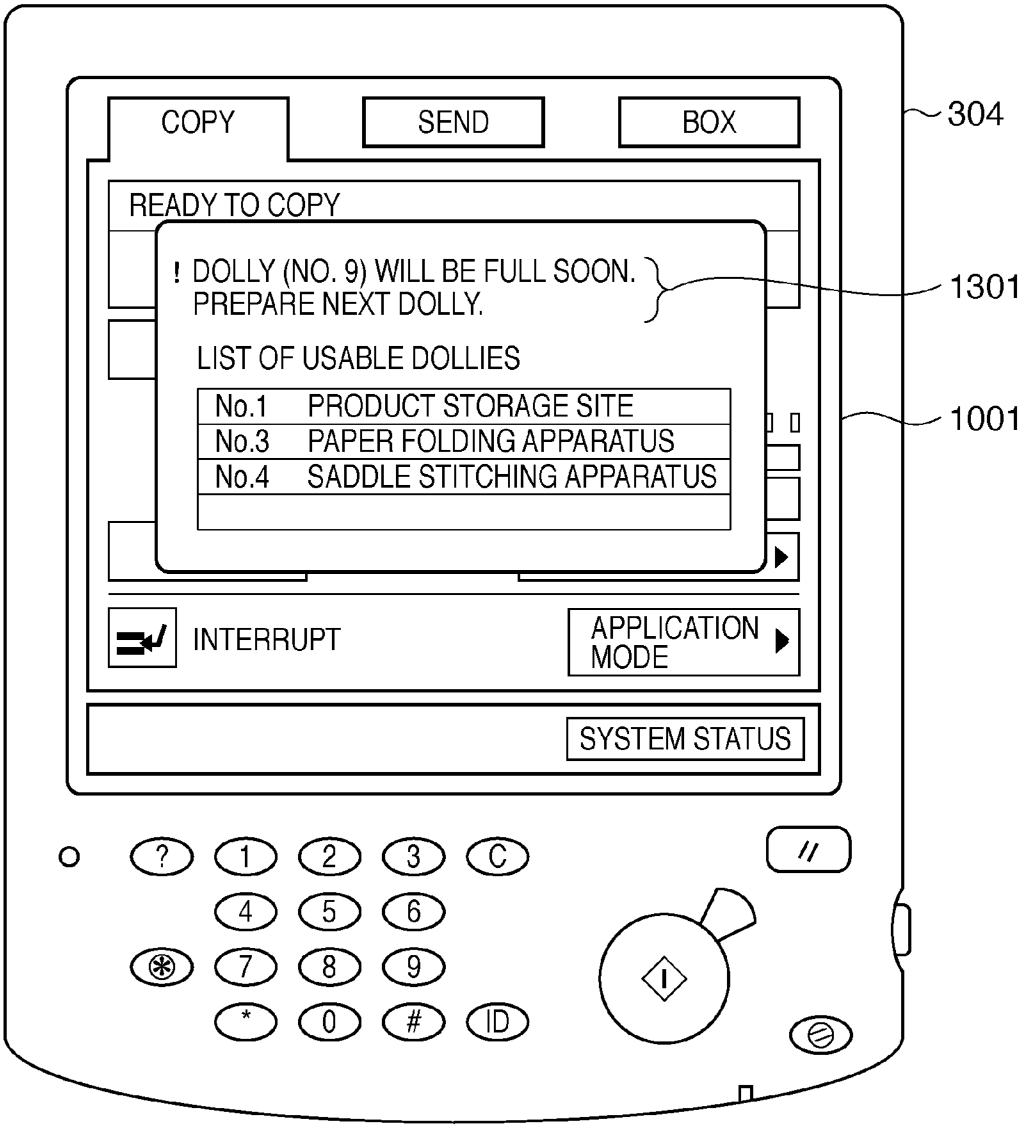
FIG. 26 is a view showing a display example of the current locations of dollies.

FIG. 26 is a view showing a display example of the current locations of dollies. As compared to the display example in FIG. 23, an alert message 1301 representing that the dolly will be full soon is displayed in addition to the dolly numbers and current locations of unused dollies. Hence, using the display example in FIG. 26, the operator can also grasp the degree of urgency of dolly preparation.

If the count value is not larger than the full stack alert count in step S727, the process returns to step S725. If the count value is larger than the maximum number of printing paper sheets stackable on the dolly, the process advances to step S730. In step S730, the CPU 301 displays, on the display device 1001, a message to prompt the user to replace the dolly because it is impossible to stack printing paper sheets on the dolly anymore. In step S731, the CPU 301 instructs the image forming unit to stop the print operation.

In step S732, the CPU 301 determines whether the reading operation of all document pages is ended. If the reading operation is ended, the CPU 301 finishes the copy job.

According to the present invention, the CPU 301 identifies the current locations of the respective dollies and displays them. Hence, the operator can easily prepare a dolly in advance. Particularly, displaying only the current locations of usable dollies (FIG. 23) saves the operator the trouble of searching for the dolly. In this embodiment, it is therefore possible to improve the operation efficiency and reduce the down time of the printing system, as compared to a conventional system incapable of displaying the current locations of dollies.

When no dolly is allocated at the discharging port regardless of the designation of printing paper sheet discharge to a dolly allocated at the discharging port, the CPU 301 may display the current location of each dolly on the display device 1001.

The CPU 301 and RAM 303 function as a specifying unit for specifying the total number of printed paper sheets of a print job (S720). The CPU 301 also functions as a determination unit for determining whether the total number of printed paper sheets is larger than the maximum number of printing paper sheets stackable on a dolly allocated at the discharging port (S721). When the total number of printed paper sheets is larger than the maximum number of stackable printing paper sheets, the CPU 301 displays the current location of each dolly on the display device. As described above, in this embodiment, even when it is not possible to stack all printing paper sheets of one print job on only one dolly, the operator can be notified of the current location of each dolly.

The CPU 301 also functions as a determination unit for determining whether the number of printed paper sheets stacked on a dolly, which is counted by a discharging counter serving as a count unit, exceeds the threshold number of printing paper sheets which triggers display of the identified current location of each dolly. When the counted number of stacked printed paper sheets exceeds the threshold number of printing paper sheets, the CPU 301 also functions as a display control unit for displaying the current location of each dolly on a display unit. In this embodiment, this notifies the operator of the current location of each dolly before the dolly is full. Hence, in this embodiment, the printing interruption time can be shortened as compared to a case in which the dolly search starts after the dolly becomes full.

When the RFID antenna 140 communicates with the RFID tag 504 mounted on each dolly, status information representing the use status of each dolly can be obtained from the dolly. Since the RFID antenna 140 is connected to the printing apparatus 100 via a network or a cable, the CPU 301 can obtain the status information of the dollies from the RFID antennas 140 arranged in various places in the print shop. The CPU 301 can implement a location identification unit with a relatively simple arrangement by using communication unit such as the RFID antenna 140 and RFID tag 504.

The ROM 302 or RAM 303 functions as a storage unit for storing place information representing the installation place of each antenna. In this case, the CPU 301 functions as a display control unit for reading out, from the storage unit, place information corresponding to an antenna capable of communicating with a dolly and displaying the place information on a display unit as the current location of the dolly. When the installation place of each antenna is stored, the current location of a corresponding dolly can easily be identified from the identification number of the antenna capable of receiving the information of the dolly.

[Other Embodiments]

In the above-described embodiments, a single printing system with the printing apparatus 100 at the center has been described. However, the number of printing apparatuses 100 or printing systems may be two or more. In this case, the CPU 301 can more properly obtain the location information of each dolly by transmitting/receiving the location information of each dolly between the printing systems.

Figure 27:
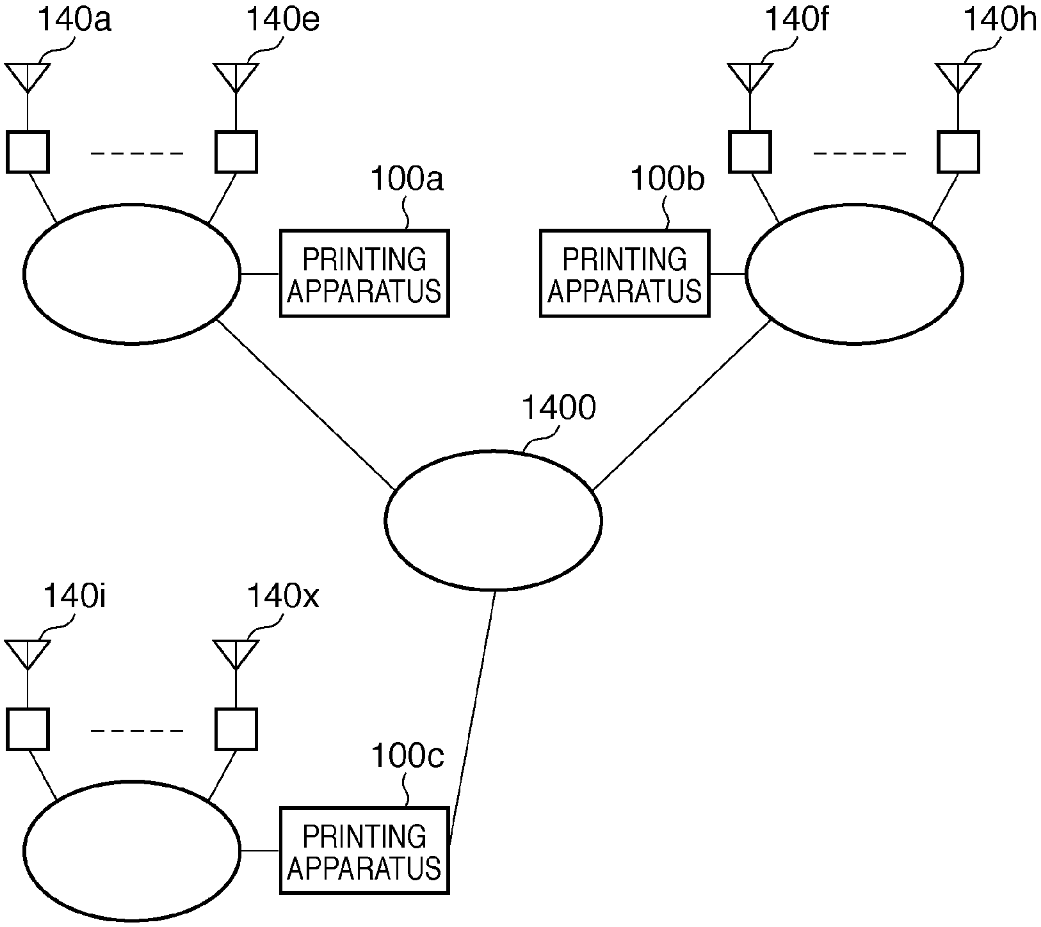
FIG. 27 is a view showing an example of a dolly location information management system.

FIG. 27 is a view showing an example of a dolly location information management system. In this example, three printing apparatuses 100*a*, 100*b*, and 100*c* are connected to each other via a network 1400.

RFID antennas 140*a* to 140*e* are connected to the printing apparatus 100*a*. RFID antennas 140*f* to 140*h* are connected to the printing apparatus 100*b*. RFID antennas 140*i* to 140*x* are connected to the printing apparatus 100*c*. A CPU 301 of each printing apparatus transmits a dolly management list 900 created by itself to the remaining printing apparatuses. An external I/F 306 functions as a network interface card (NIC) to the network 1400.

The respective printing apparatuses form different printing systems. A unique identification is added to each printing system. The CPU 301 functions as an acquisition unit for acquiring, from another printing system connected via the network 1400, the information of the current location of each dolly identified by the other printing system. The CPU 301 displays, on a display device 1001, the current location of each dolly identified by another printing system. This makes it possible to properly search for a dolly even when a plurality of printing systems operate in one print shop.

Figure 28:
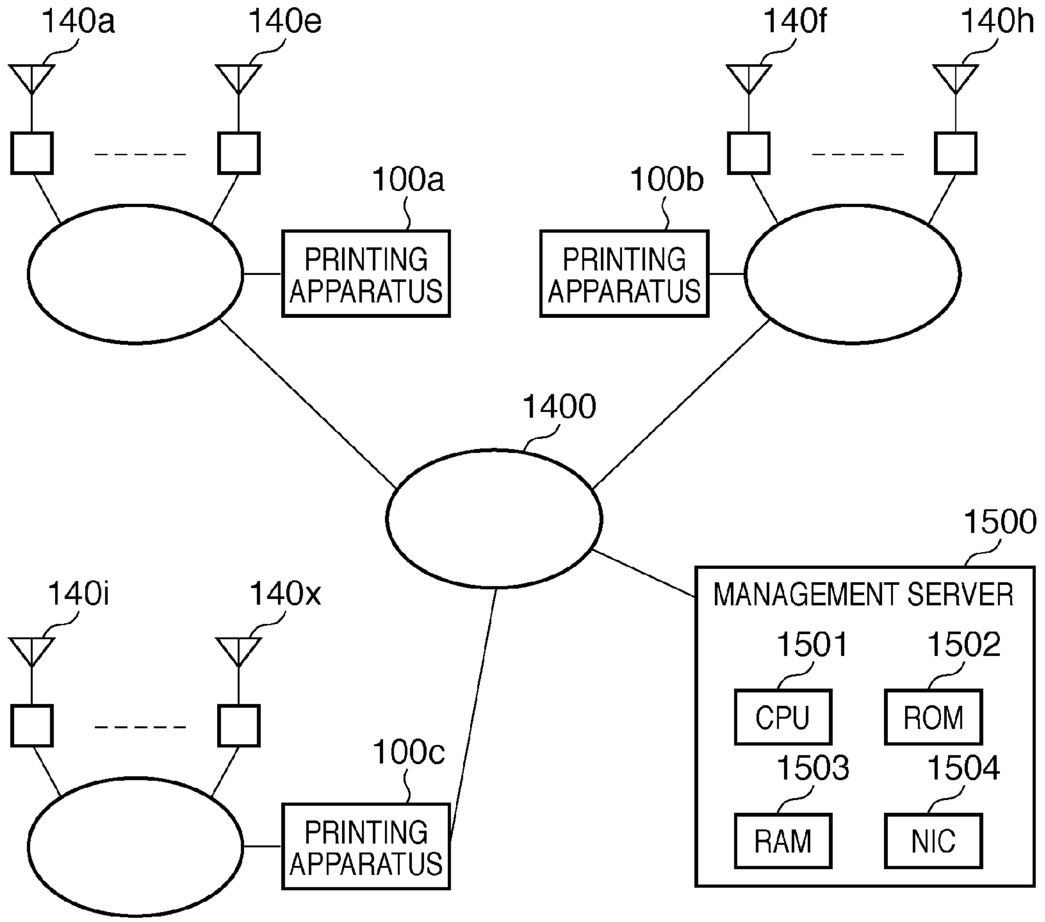
FIG. 28 is a view showing another example of the dolly location information management system.

FIG. 28 is a view showing another example of the dolly location information management system. A management server 1500 is added, as compared to FIG. 27. A CPU 1501 of the management server 1500 manages the current location of each dolly identified by the plurality of printing systems connected via the network. The CPU 1501 operates in accordance with a computer program stored in a ROM 1502. The CPU 1501 creates a dolly management database by, for example, periodically obtaining the current location and status information of each dolly from each printing apparatus via an NIC 1504 and stores the dolly management database in a RAM 1503. The NIC 1504 is a communication unit for communicating with each printing apparatus via the network 1400. The dolly management database is created by merging the dolly management lists 900 obtained from the printing apparatuses.

The CPU 301 of each printing apparatus functions as an acquisition unit for acquiring the current location of each dolly from the management server 1500. The CPU 301 displays, on the display device 1001, the current location of each dolly acquired from the management server 1500. In this case, since the printing apparatuses need not individually communicate, the traffic in the network 1400 can be relaxed.

In the above-described embodiments, the counter counts the number of printing paper sheets stacked on a dolly. When the number of stacked printing paper sheets has reached the full stack alert count, a message to prompt the user to prepare the next dolly is output. In place of this arrangement, the CPU 301 may output the message to prompt the user to prepare a dolly in accordance with the height of the dolly in the stack tray. The dolly moves down as printing paper sheets are stacked on it. That is, a correlation is present between the number of stacked printing paper sheets and the height of the dolly. Hence, when a height detection mechanism is added, the counter can be omitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-067594, filed on Mar. 15, 2007, and Japanese Patent Application No. 2007-073540, filed on Mar. 20, 2007 which are hereby incorporated by reference herein in their entirety.

The invention claimed is:

1. A printing apparatus which forms an image on a sheet in accordance with an input print job, comprising:

a designation unit configured to designate a dolly to be used for the print job from among a plurality of dollies which are assigned different dolly identification information and used to stack a sheet discharged from a discharging port of the printing apparatus;

a dolly detection unit configured to detect dolly identification information of a dolly allocated at the discharging port;

a notification device configured to notify a user of information; and a control unit configured to cause said notification device to notify the user that the dolly designated by said designation unit is not allocated at the discharging port when said dolly detection unit does not detect the dolly identification information of the dolly designated by said designation unit.

2. The printing apparatus according to claim 1, further comprising a location detection unit configured to detect a location where each of the dollies is positioned, wherein when said dolly detection unit does not detect the dolly identification information of the dolly designated by said designation unit, said control unit causes said notification device to notify the user of the location where the dolly designated by said designation unit is positioned according to a detection result of said location detection unit.

3. The printing apparatus according to claim 2, further comprising:

a reception unit configured to receive a user identification information of an operator who is using said printing apparatus; and a user management table configured to manage a plurality of user identification information and dolly identification information of dollies whose use is allowed for each user identification information in association with each other, wherein said control unit reads out the dolly identification information corresponding to the received user identification information from said user management table and causes said notification device to display the read out dolly identification information as a designation candidate to be designated by said designation unit.

4. The printing apparatus according to claim 2, further comprising:

a dolly location management table configured to manage the location of each of the dollies and the dolly identification information of each of the dollies in association with each other, wherein said control unit extracts a location of the dolly designated by said designation unit from said dolly location management table, thereby causing said notification device to notify the user of the location of the designated dolly.

5. The printing apparatus according to claim 2, further comprising:

a determination unit configured to determine on the basis of the current location of the dolly designated by said designation unit whether the dolly is being used by another printing apparatus; and a reservation unit configured to reserve the dolly that is being used by said other printing apparatus for use next to a print job in said other printing apparatus.

6. The printing apparatus according to claim 5, further comprising a decision unit configured to decide whether the dolly allocated at the discharging port is reserved by another printing apparatus, wherein when the dolly allocated at the discharging port is reserved by the another printing apparatus, said control unit causes said notification device to output a message to prompt the user to move the dolly to said other printing apparatus.

7. The printing apparatus according to claim 5, further comprising a prohibition unit configured to prohibit designation by said designation unit for the dolly that is being used or reserved by another printing apparatus.

8. The printing apparatus according to claim 5, wherein when said designation unit is going to designate the dolly that is being used or reserved by the another printing apparatus, said control unit causes said notification device to notify the user that the dolly is being used or reserved.

9. The printing apparatus according to claim 2, further comprising:

a plurality of antennas configured to be installed in different places; and a storage unit configured to store place information representing an installation place of each of the antennas;

wherein said location detection means reads out, from said storage unit, place information corresponding to the antenna capable of communicating with the dolly and detects the place information on said display unit as the current location of the dolly.

10. The printing apparatus according to claim 1, further comprising a sheet detection unit configured to detect that sheets are stacked on the dolly, wherein when said detection unit detects the dolly identification information of the dolly designated by said designation unit, and the dolly allocated at the discharging port has sheets stacked, said control unit causes said notification device to notify the user that the sheets are stacked on the dolly.

11. The printing apparatus according to claim 1, further comprising:

a specifying unit configured to specify the total number of sheets of a print job executed by said printing apparatus;

a determination unit configured to determine whether a total number of sheets is larger than a limit number of stackable sheets that is a number to limit stacking on the dolly allocated at the discharging port; and a display control unit configured to display the current location of each other dolly on said display unit when the total number of sheets is larger than the limit number of stackable sheets.

12. The printing system according to claim 1, further comprising:

a count unit configured to count the number of stacked sheets on the dolly allocated at the discharging port;

a determination unit configured to determine whether the counted number of stacked sheets is larger than a predetermined threshold number of sheets; and a display control unit configured to display the current location of each dolly on said display unit when the counted number of stacked sheets is larger than the threshold number of printing paper sheets.

13. The printing apparatus according to claim 1, further comprising:

a communication unit configured to communicate with a communication device mounted on said each of the dollies;

a obtaining unit configured to obtain, via said communication unit, status information representing a use status of said each of the dollies, wherein said control unit causes said notification device to display the current location of the dolly usable for the print job on the basis of the obtained status information.

14. The printing apparatus according to claim 1, further comprising an acquisition unit configured to acquire, from another printing apparatus connected via a network, the current location of each of the dollies identified by said other printing apparatus, wherein said notification device also notifies of the location of each of the dollies identified by said other printing apparatus.

15. The printing apparatus according to claim 1, further comprising an acquisition unit configured to acquire the current location of each of the dollies from a management server which manages the location of each of the dollies identified by another printing apparatus connected via a network, wherein said notification device also notifies of the location of each of the dollies obtained from the management server.

16. A printing system comprising:

a printing apparatus configured to form an image on a sheet in accordance with an input print job;

a plurality of dollies configured to be assigned different dolly identification information and used to stack the sheet discharged from a discharging port of said printing apparatus;

a designation unit configured to designate one dolly to be used for the print job;

a dolly detection unit configured to detect dolly identification information of the dolly allocated at the discharging port;

a notification device configured to notify a user of information; and a control unit configured to cause said notification device to notify the user that the dolly designated by said designation unit is not allocated at the discharging port when said dolly detection unit does not detect the dolly identification information of the dolly designated by said designation unit.

17. A dolly designation method in a printing system including a printing apparatus configured to form an image on a sheet in accordance with an input print job, and a plurality of dollies configured to be assigned different dolly identification information and used to stack a sheet discharged from a discharging port of the printing apparatus, the method comprising:

a designation step of designating a dolly to be used for the print job;

a dolly detection step of detecting dolly identification information of a dolly allocated at the discharging port;

a notification step of notifying a user of alert information when the dolly identification information of the dolly designated in the designation step is not detected in the dolly detection step.

* * * * *